US012711433B2

(12) United States Patent
Grisard et al.

(10) Patent No.: US 12,711,433 B2
(45) Date of Patent: Aug. 18, 2026

(54) SYSTEMS AND TECHNIQUES FOR OPTIMIZING THE IMPLEMENTATION AND OPERATION OF POWER-TO-X PLANTS

(71) Applicant: THE BOSTON CONSULTING GROUP, INC., Boston, MA (US)

(72) Inventors: Malo Grisard, Zurich (CH); Pierre Meziane, Paris (FR); Dylan Ankrah, Paris (FR); Martin Pocquet, Paris (FR); Krzysztof Postek, Rotterdam (NL); Ariane Dalens, Levallois-Perret (FR); Markus Ruplitsch, Munich (DE); Hamid Maher, Casablanca (MA)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 99 days.

(21) Appl. No.: 18/463,636

(22) Filed: Sep. 8, 2023

(65) Prior Publication Data

US 2025/0086526 A1 Mar. 13, 2025

(51) Int. Cl.
*G06Q 10/04* (2023.01)
*G06Q 50/06* (2012.01)

(52) U.S. Cl.
CPC ............. *G06Q 10/04* (2013.01); *G06Q 50/06* (2013.01)

(58) Field of Classification Search
CPC ........................................... G06Q 10/00–90/00
See application file for complete search history.

(56) References Cited

U.S. PATENT DOCUMENTS

2012/0083933 A1 4/2012 Subbu et al.
2020/0327435 A1* 10/2020 Wang ...................... G06F 30/18
2023/0020417 A1 1/2023 Elbsat et al.
(Continued)

FOREIGN PATENT DOCUMENTS

EP 3026510 A1 6/2016
WO WO-2021163769 A1 * 8/2021 ............... C25B 1/27

OTHER PUBLICATIONS

International Search Report and Written Opinion in International Appln. No. PCT/US2024/045535, mailed on Dec. 2, 2024, 11 pages.

(Continued)

*Primary Examiner* — Arif Ullah
(74) *Attorney, Agent, or Firm* — Fish & Richardson P.C.

(57) ABSTRACT

In an example method, a system accesses a first data set representing parameters for implementing and operating a Power-to-X plant, and determines one or more configurations of the Power-to-X plant based on the first data set and a Bayesian optimization process. The configurations are determined by parsing the first data set to identify fields in the first data set, each representing a respective parameter; generating a plurality of data vectors representing respective first candidate configurations of the Power-to-X plant; inputting the data vectors and the first data set into a computer model; predicting, based on the computer model, a performance of the Power-to-X plant according to each of the first candidate configurations; and generating, using the Bayesian optimization process, one or more second candidate configurations based on the predicted performance. Further, the system generates and stores a second data set representing the one or more configurations of the Power-to-X plant.

24 Claims, 15 Drawing Sheets

(56) References Cited

U.S. PATENT DOCUMENTS

2023/0333522 A1 * 10/2023 Cella .................... G06Q 10/04

OTHER PUBLICATIONS

Allen, "Atmospheric science: Cause of the 2020 rise in atmospheric methane," Nature, Dec. 2022, 612(7940):413-414.

Alshehri et al., "Modelling and evaluation of PEM hydrogen technologies for frequency ancillary services in future multi-energy sustainable power systems," Heliyon, Apr. 2019, 5(4):e01396, 24 pages.

Andrea et al., "Techno-economic analysis of in-situ production by electrolysis, biomass gasification and delivery systems for Hydrogen Refuelling Stations: Rome case study," Energy Procedia, Aug. 2018, 148:82-89.

Arnaiz del Pozo et al., "Techno-economic assessment of blue and green ammonia as energy carriers in a low-carbon future," Energy Conversion and Management, Mar. 2022, 255:115312, 17 pages.

Bhandari et al.,"Hydrogen as energy carrier: Techno-economic assessment of decentralized hydrogen production in Germany," Renewable Energy, Nov. 2021, 177:915-931.

De Menezes et al., "Germany's Nuclear Power Plant Closures and the Integration of Electricity Markets in Europe," Energy Policy, Oct. 2015, 85:357-368.

eib.org [online], "Unlocking the hydrogen economy—stimulating investment across the hydrogen value chain," May 2022, retrieved on Oct. 7, 2024, retrieved from URL<https://www.eib.org/attachments/publications/unlocking_the_hydrogen_economy_en.pdf>, 40 pages.

irena.org [online], "Hydrogen from renewable power: Technology outlook for the energy transition," Sep. 2018, retrieved on Oct. 8, 2024, retrieved from URL<https://www.irena.org/publications/2018/Sep/Hydrogen-from-renewable-power>, 52 pages.

Matute et al., "Optimal dispatch model for PV-electrolysis plants in self-consumption regime to produce green hydrogen: A Spanish case study," International Journal of Hydrogen Energy, Jul. 2022, 47(60):25202-25213.

Maurer et al., "Parameter study for dimensioning of a PV optimized hydrogen supply plant," International Journal of Hydrogen Energy, Dec. 2022, 47(97):40815-40825.

Meredith et al., "Technical Note on the Valuation of Real Options," Insead, Dec. 2002, 5045, 19 pages.

Nayak-Luke et al., "Techno-economic viability of islanded green ammonia as a carbon-free energy vector and as a substitute for conventional production," Energy and Environmental Science, Jul. 2020, 13(9):2957-2966.

Pammer et al., "Forecasting the Penetration of a New Product—A Bayesian Approach," Journal of Business and Economic Statistics, Oct. 2000, 18(4):428-435.

Paraschiv et al., "The impact of renewable energies on EEX day-ahead electricity prices," Presented at Proceedings of the International Conference on Management Science, Lisbon, Lisbon, Portugal, May 29-31, 2014; Energy Policy, Oct. 2014, 73:196-210.

Pfenninger et al., "Long-term patterns of European PV output using 30 years of validated hourly reanalysis and satellite data," Energy, Nov. 2016, 114:1251-1265.

Sáenz de Miera et al., "Analysing the impact of renewable electricity support schemes on power prices: The case of wind electricity in Spain," Energy Policy, Sep. 2008, 36(9):3345-3359.

Sagel et al., "Green ammonia enables sustainable energy production in small island developing states: A case study on the island of Curaçao," Renewable and Sustainable Energy Reviews, Jun. 2022, 161:112381, 10 pages.

Salmon et al., "Green ammonia as a spatial energy vector: a review," Sustainable Energy and Fuels, May 2021, 5(11):2814-2839.

Shepherd et al., "Open-source project feasibility tools for supporting development of the green ammonia value chain," Energy Conversion and Management, Dec. 2022, 274:116413, 12 pages.

Staffell et al., "Using bias-corrected reanalysis to simulate current and future wind power output," Energy, Nov. 2016, 114:1224-1239.

Woo et al., "The impact of wind generation on the electricity spot-market price level and variance: the Texas experience," Energy Policy, Jul. 2011, 39(7):3939-3944.

Worthington et al., "Transmission of prices and price volatility in Australian electricity spot markets: A multivariate GARCH analysis," Energy Economics, Mar. 2005, 27(2):337-350.

Yates et al., "Techno-economic Analysis of Hydrogen Electrolysis from Off-Grid Stand-Alone Photovoltaics Incorporating Uncertainty Analysis," Cell Reports Physical Science, Oct. 2020, 1(10):100209, 35 pages.

Yatsenko et al., "Review on modern ways of insulation of reservoirs for liquid hydrogen storage," International Journal of Hydrogen Energy, Dec. 2022, 47(97):41046-41054.

Zhang et al., "Tech-eco Efficiency Evaluation of hydrogen production industry under carbon dioxide Emissions regulation in China," International Journal of Hydrogen Energy, Dec. 2022, 47(97):41183-41194.

Zhao et al., "Exploring supply chain design and expansion planning of China's green ammonia production with an optimization-based simulation approach," International Journal of Hydrogen, Sep. 2021, 46(64):32331-32349.

Zou et al.,"Electricity markets evolution with the changing generation mix: An empirical analysis based on China 2050 High Renewable Energy Penetration Roadmap," Applied Energy, Jan. 2017, 185(1):56-67.

* cited by examiner

400

410

Accessing, from one or more hardware data storage devices, a first data set representing one or more parameters for implementing and operating a Power-to-X plant
602

Determining one or more configurations of the Power-to-X plant based on the first data set and a Bayesian optimization process, including:
(i) parsing, by a parser module, the first data set to identify one or more fields in the first data set, where each of the one or more fields represents a respective parameter and specifies a value of that parameter;
(ii) generating a plurality of data vectors representing respective first candidate configurations of the Power-to-X plant,
(iii) inputting the data vectors and the first data set into a data processing application for executing a computer model, where the computer model is configured to provide a digital representation of the Power-to-X plant,
(iv) predicting, based on the execution of the data processing application, a performance of the Power-to-X plant according to each of the first candidate configurations, and
(v) generating, using the Bayesian optimization process, one or more second candidate configurations based on the predicted performance
604

Generate a second data set representing the one or more configurations of the Power-to-X plant
606

Storing the second data set using the one or more hardware data storage devices
608

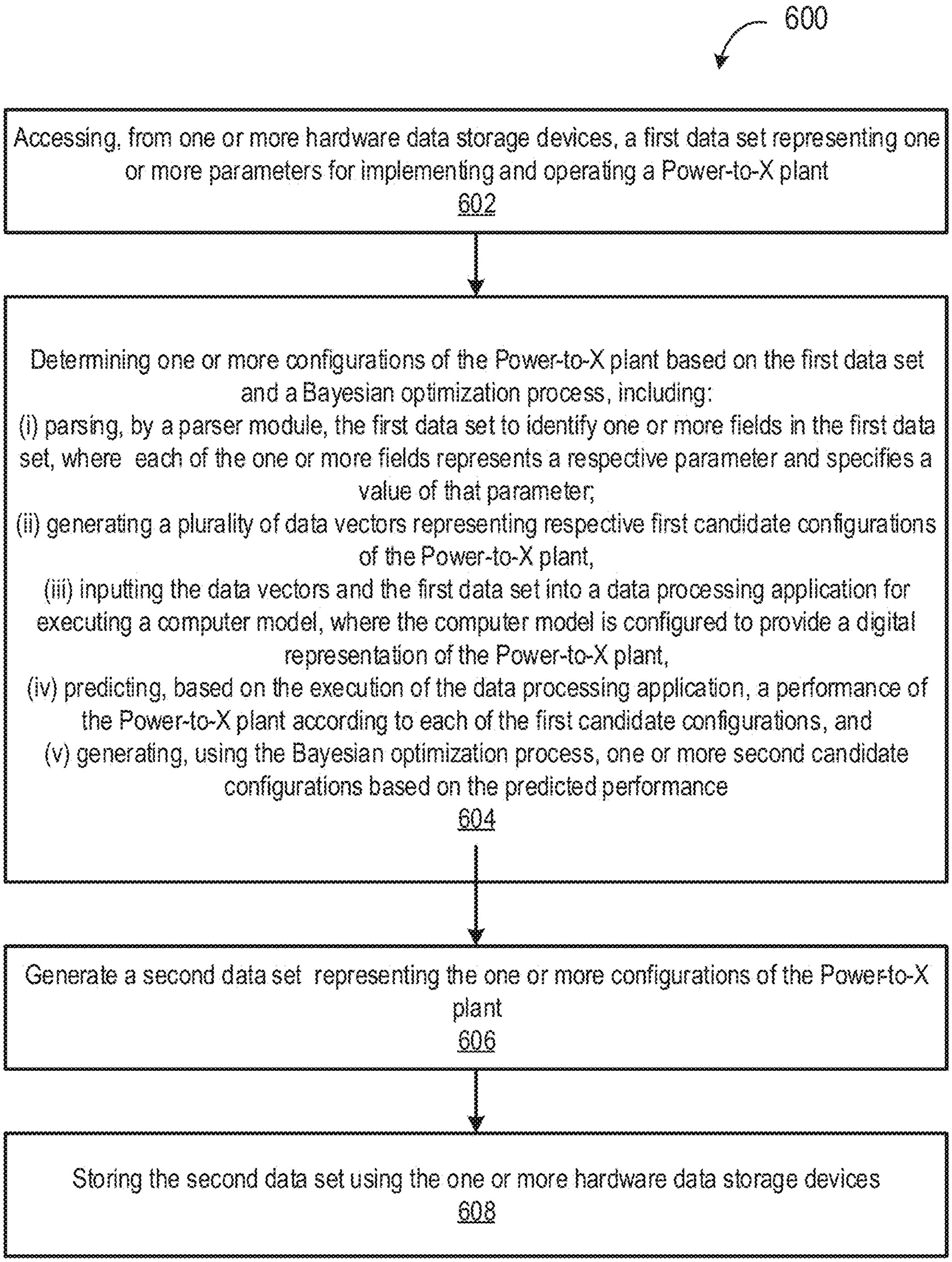

FIG. 6

SYSTEMS AND TECHNIQUES FOR OPTIMIZING THE IMPLEMENTATION AND OPERATION OF POWER-TO-X PLANTS

TECHNICAL FIELD

The disclosure relates to systems and methods for optimizing the implementation and operation of Power-to-X plants using computer models.

BACKGROUND

In general, a Power-to-X plant produces one or more products ("X") using electrical power (e.g., to facilitate the storage and/or reconversion of the electrical power).

As an example, a Power-to-X plant can receive surplus electrical power from a power grid, such as the electrical power that exceeds the present demand of the power grid. As another example, a Power-to-X plant can receive electrical power generated by one or more renewal energy sources (e.g., solar power, wind power, hydroelectric power, geothermal power, etc.).

Further, the Power-to-X plant can use the electrical power to generate products such as ammonia, chemicals, fuel, gas, and/or any other product. Further, the resulting products can be stored, and subsequently reconverted into electrical power (e.g., when the power grid is insufficient to meet demand).

SUMMARY

In general, a computer system can be configured to optimize the implementation and/or operation of a Power-to-X plant using one or more computer models.

As an example, the computer system can receive input data representing one or more parameters for implementing and/or operating a Power-to-X plant. Example parameters include the types of processes that can be performed by the Power-to-X plant, the products that can be produced by the Power-to-X plant, the demand for those products, the cost and the time associated with implementing the Power-to-X plant, the geographical location of the Power-to-X plant, and any other information pertinent to implementing and/or operating the Power-to-X plant.

Based on this information, the computer system determines several candidate configurations for the Power-to-X plant. For instance, the computer system can generate several data vectors, each representing a different respective candidate configuration for the Power-to-X plant. As an example, each candidate configuration can specify that the Power-to-X plant perform certain processes to produce certain products, be provided with a certain amount of input power, have a certain amount of product storage capacity, have a certain amount of energy storage capacity, and/or have any other characteristics.

Further, using a computer model, the computer system simulates or predicts the performance of the Power-to-X plant according to each of the candidate configurations. Further, the computer system selects one or more of the candidate configurations (e.g., representing one or more optimized configurations of the Power-to-X plant), and data representing the selected configuration of Power-to-X plant.

In some implementations, the techniques described herein can be performed as a part of a pre-feasibility study with respect to a Power-to-X project (e.g., a project to plan, implement, and/or operate a Power-to-X plant). As an example, the techniques described herein can be performed to assess whether the Power-to-X project should proceed based on technical, environment, regulatory, and/or market considerations.

In some implementations, the techniques described can generate one or more outputs that are deployed in the real world. For example, as described above, the techniques described herein can identify an optimized configuration of a Power-to-X plant. Further, a Power-to-X plant can be constructed and/or modified according to the selected configuration. Further still, the Power-to-X plant can be operated according to the selected configuration and the operational context. For instance, the Power-to-X plant can be operated by receiving a specified amount of electrical power, and performing one or more specified processes to produce corresponding products. In turn, the products can be stored, transported to other locations, and/or reconverted into electrical energy.

The implementations described in this disclosure can provide various technical benefits. For instance, in some implementations, the systems and techniques described herein can be performed to improve the performance of a Power-to-X plant. As an example, these systems and techniques can be used by a computer system to automatically identify optimized configurations of a Power-to-X plant that are particularly high performing and/or efficient, such that the Power-to-X plant can operate in a more effective manner. Further, these systems and techniques can be used by a computer system to automatically identify optimized configurations for specific use cases (e.g., given certain technical and/or economic constraints that are specific to that use case), such that each deployment of a Power-to-X plant is specifically customized for its respective use case.

Further, the systems and techniques described herein can be performed by a computer system using computer-specific techniques to achieve a result that otherwise would require subjective input from a human. For example, in at least some implementations, a computer system can perform these techniques using one or more computer models (e.g., one or more computer models implementing a Bayesian optimization process) to identify an optimized configuration of a Power-to-X plant in an objective manner. Absent these techniques, a human would subjectively review data regarding Power-to-X plants, and determine a configuration for a Power-to-X plant based on subjective factors, which may result in configurations that have a lower performance and/or are less efficient than those that are generated by a computer system using a computer model. Further, absent these techniques, a human's subjective review of the data may produce inconsistent and/or unpredictable results (e.g., compared to those that are generated by a computer system using a computer model).

Further, the systems and techniques described herein can be performed by a computer system to achieve results that otherwise would be infeasible for a human to produce through manual review. For example, in at least some implementations, a computer system can perform these techniques to optimize the configuration of a Power-to-X plant according to a large array of factors and criteria, which otherwise would be infeasible for a human to perform manually. Accordingly, the configuration of the Power-to-X plant is optimized to degree that would otherwise not be feasible based on human efforts alone.

In an aspect, a method includes: accessing, by one or more processors from one or more hardware data storage devices, a first data set representing one or more parameters for implementing and operating a Power-to-X plant; and determining, by the one or more processors, one or more configurations of the Power-to-X plant based on the first data set and a Bayesian optimization process. Determining the one or more configurations of the Power-to-X plant design includes: parsing, by a parser module, the first data set to identify one or more fields in the first data set, where each of the one or more fields represents a respective parameter and specifies a value of that parameter; generating a plurality of data vectors representing respective first candidate configurations of the Power-to-X plant, inputting the data vectors and the first data set into a data processing application for executing a computer model, where the computer model is configured to provide a digital representation of the Power-to-X plant; predicting, based on the execution of the data processing application, a performance of the Power-to-X plant according to each of the first candidate configuration; and generating, using the Bayesian optimization process, one or more second candidate configurations based on the predicted performance. The method also includes generating, by the one or more processors, a second data set representing the one or more configurations of the Power-to-X plant; and storing, by the one or processors, the second data set using the one or more hardware data storage devices.

Implementations of this aspect can include one or more of the following features.

In some implementations, the method can also include causing a graphical user interface to be presented to a user. The graphical user interface can include one or more first user interface elements representing the one or more configurations of the Power-to-X plant.

In some implementations, the graphical user interface can include one or more second user interface elements representing an output of the computer model.

In some implementations, predicting the performance of the Power-to-X plant can include determining a first set of forecast data representing at least one of a forecasted market condition or a forecasted environmental condition during a first time interval; simulating, using the computer model, a first operation of the Power-to-X plant during the first time interval based on the first set of forecast data; and determining an output of the Power-to-X plant during the first time interval based on the simulated first operation.

In some implementations, the first set of forecast data can represent at least one of: a forecasted solar activity during the first time interval, a forecasted wind activity during the first time interval, a forecasted commodity price during the first time interval.

In some implementations, predicting the performance of the Power-to-X can further include: determining a second set of forecast data representing at least one of a forecasted market condition or a forecasted environmental condition during a second time interval subsequent to the first time interval; simulating, during the computer model, a second operation of the Power-to-X plant during the second time interval based on the second set of forecast data; and determining an output of the Power-to-X plant during the second time interval based on the simulated second operation.

In some implementations, predicting the performance of the Power-to-X plant can include: determining a plurality of consecutive time intervals; and for each of the time intervals: determining a set of forecast data representing at least one of a forecasted market condition or a forecasted environmental condition during that time interval, simulating, using the computer model, an operation of the Power-to-X plant during that time interval based on the set of forecast data, and determining an output of the Power-to-X plant during that time interval based on the simulated operation.

In some implementations, determining the one or candidate configurations can include: determining one or more objective functions representing the performance of the Power-to-X plant; determining one or more selection criteria with respect to the one or more objective functions; and determining, using the Bayesian optimization process, one or more of the first and/or the second candidate configurations that satisfy the one or more selection criteria.

In some implementations, the first data set can represent one or more types of production processes of the Power-to-X plant.

In some implementations, the one or more types of production processes can include at least one of: a water electrolysis process, a fuel production process, or an ammonia production process.

In some implementations, the first data set can represent, for each of the one or more types of production processes, at least one of: a cost associated with implementing that type of production process at the Power-to-X plant, a time associated with implementing that type of production process at the Power-to-X plant, a demand for products produced by that type of production process at the Power-to-X plant, an efficiency of that type of production process at the Power-to-X plant, a degradation over time of that type of production process at the Power-to-X plant, or a geographical location of the Power-to-X plant.

In some implementations, each of the first and the second candidate configurations of the Power-to-X plant can represent at least one of: an amount of power received by the Power-to-X plant from one or more power sources, an energy storage capacity of the Power-to-X plant, an amount of power input to one or more water electrolyzers of the Power-to-X plant, a hydrogen storage capacity of the Power-to-X plant, a fuel storage capacity of the Power-to-X plant, or an ammonia storage capacity of the Power-to-X plant.

In some implementations, the one or more power sources can include at least one of: a solar power source, or a wind power source In some implementations, the method can also include determining, for each of the first and the candidate configurations, a sensitivity of the performance of the Power-to-X plant according to the design options defined by that candidate configuration.

In some implementations, the method can also include predicting the performance of the Power-to-X plant a plurality of times, where each prediction is performed based on a different respective set of assumptions regarding a price of power.

In some implementations, the method can also include implementing and operating the Power-to-X plant based on the second data set.

In some implementations, generating the one or more second candidate configurations can include: determining, based on the predicted performance of each of the first candidate configurations, an estimate of an objective function, where the objective function represents a performance of the Power-to-X plant based on one or more input parameters; and generating the one more second candidate configurations based on the estimate of the objective function.

In some implementations, determining the one or more configurations can include predicting, based on the execution of the data processing application, the performance of the Power-to-X plant according to each of the one or more second candidate configurations.

In some implementations, determining the one or more configurations can include selecting the one or more configurations from among the first and second configurations based on the predicted performance.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

BRIEF DESCRIPTION OF DRAWINGS

FIG. 6 is a flow chart diagram of an example process for optimizing an implementation and/or operation of a Power-to-X plant.

DETAILED DESCRIPTION

Figure 1:
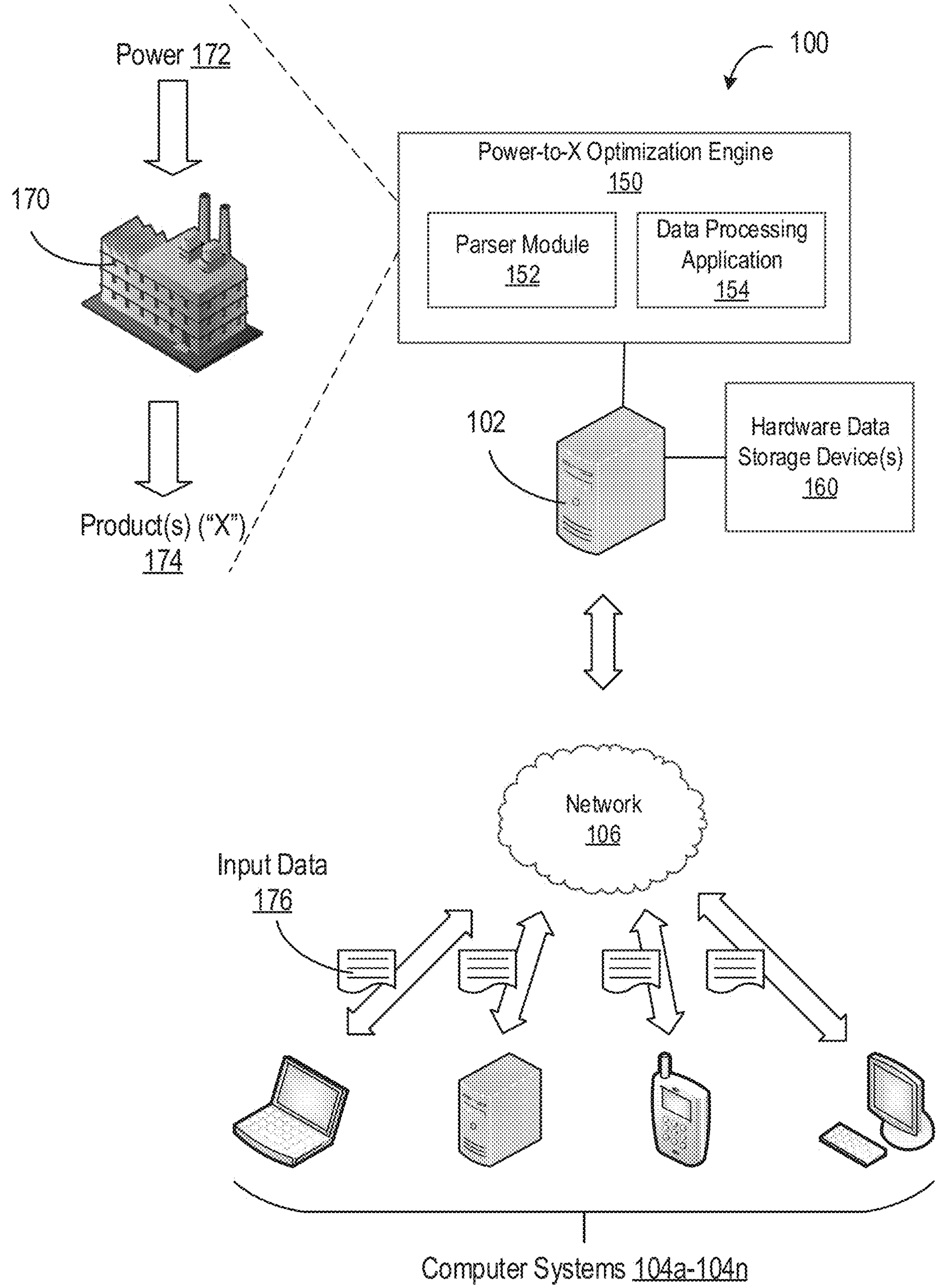
FIG. 1 is a diagram of an example system for optimizing an implementation and/or operation of a Power-to-X plant using a computer model.

In general, a Power-to-X plant produces one or more products ("X") using electrical power. As an example, as shown in FIG. 1, a Power-to-X plant 170 is configured to receive electrical power 172 and produce one or more products 174 using the received electrical power 172.

In some implementations, at least some of the electrical power 172 can be surplus electrical power from an electrical grid. For example, an electrical grid may provide a particular amount of electrical power that exceeds the demand of its users. At least some of this surplus electrical power can be provided to the Power-to-X plant 170 to facilitate the production of the one or more products 174.

In some implementations, at least some of the electrical power 172 can be electrical power generated by one or more renewable energy sources. For example, at least some of the electrical power 172 can be electrical power generated by solar power generators, window power generators, hydroelectric power generators, geothermal power generators, and/or any other type of renewable power generator. In some implementations, at least some of the energy sources can be located at the same location as the Power-to-X plant 170. In some implementations, at least some of the energy sources can be located at the location that is different than that of the Power-to-X plant 170.

The Power-to-X plant 170 can be configured to perform various processes to produce various corresponding products. As an example, the Power-to-X plant 170 can be configured to perform a water electrolysis process to produce hydrogen gas (e.g., by using electrical power to split water into oxygen and hydrogen). As another example, the Power-to-X plant 170 can be configured to perform a fuel production process (e.g., by using electrical power to produce a fuel such as methane). As another example, the Power-to-X plant 170 can be configured to perform an ammonia production process. Although example processes and products are described herein, in practice, other processes and/or products are also possible, depending on the implementation.

In some implementations, the products 174 produced by the Power-to-X plant 170 can be stored, transported, and/or reconverted into electrical power. For example, at least some of the products 174 can be stored locally by the Power-to-X plant, and subsequently reconverted into electrical power at some time in the future. In turn, the electrical power can be provided to the power grid (e.g., when the electrical power provided by the power grid is insufficient to meet demand) and/or to power the Power-to-X plant 170.

As another example, at least some of the products 174 can be transported to other locations (e.g., via pipelines, ships, airplanes, ground transportation, etc.) and subsequently reconverted into electrical power at those locations (e.g., to provide a primary and/or a supplemental power source at those locations).

Further, as shown in FIG. 1, a system 100 can be configured to optimize the implementation and/or operation of the Power-to-X plant 170 using one or more computer models.

The system 100 includes a Power-to-X optimization engine 150 maintained on a computer system 102. The Power-to-X optimization engine 150 includes at least a parser module 152 and a data processing application 154.

During an example operation of the system 100, the Power-to-X optimization engine 150 receives input data 176 from one or more computer systems 104*a*-104*n* via a network 106. For instance, the Power-to-X optimization engine 150 can receive input data 176 representing one or more parameters for implementing and/or operating the Power-to-X plant 170. Example parameters include the types of processes that can be performed by the Power-to-X plant 170, the products 174 that can be produced by the Power-to-X plant 170, the demand for those products 174, the cost and the time associated with implementing the Power-to-X plant 170, the geographical location of the Power-to-X plant 170, and/or any other information pertinent to implementing and/or operating the Power-to-X plant 170.

Based on this information, the Power-to-X optimization engine 150 determines several candidate configurations for the Power-to-X plant 170. For instance, the Power-to-X optimization engine 150 can generate several data vectors, each representing a different respective candidate configuration for the Power-to-X plant 170. As an example, each candidate configuration can specify that the Power-to-X plant 170 perform certain processes to produce certain products 174, be provided with a certain amount of input power 172, have a certain amount of product storage capacity, have a certain amount of energy storage capacity, and/or have any other characteristics.

Further, using a computer model, the Power-to-X optimization engine 150 predicts the performance of the Power-to-X plant 170 according to each of the candidate configurations. Further, the Power-to-X optimization engine 150 selects one or more of the candidate configurations (e.g., representing one or more optimized configurations of the Power-to-X plant 170), and stores data representing the selected configuration of the Power-to-X plant 170 (e.g., using one or more hardware data storage devices 160 of the computer system 102).

In some implementations, the Power-to-X optimization engine 150 can be operated to support a pre-feasibility study with respect to a Power-to-X project (e.g., a project to plan, implement, and/or operate the Power-to-X plant 170). As an example, the Power-to-X optimization engine 150 can generate and output data that allows users to assess whether the Power-to-X project should proceed based on technical, environment, regulatory, and/or market considerations.

In some implementations, one or more of the selected configurations of the Power-to-X plant 170 can be deployed in the real world. As an example, data representing a selected configuration of the Power-to-X plant 170 can be retrieved from the hardware data storage device 160. Further, the Power-to-X plant 170 can be constructed and/or modified according to the retrieved data (e.g., such that the Power-to-X plant 170 is configured to perform certain processes using a certain amount of input power, produce certain products, have certain power and/or product storage capacities, etc., in accordance with the selected configuration). Further, the Power-to-X plant 170 can be operated according to the retrieved data. For instance, the Power-to-X plant 170 can be operated by receiving a specified amount of electrical power 172, and performing one or more specified processes to produce corresponding products 174 in accordance with the selected configuration. Further, the products 174 can be subsequently stored, transported to other locations, and/or reconverted into electrical energy.

In general, the input data 176 and/or the data generated by the Power-to-X optimization engine 150 can be embodied as one or more data structures. In general, a data structure can refer to the arrangement or format of data that is generated, stored, and/or modified by a computer system. As an example, a data structure can include a particular arrangement of data fields, each storing a particular type of data. Further, a data structure can include data labels identifying one or more of the data fields (e.g., identifying the type of data stored in each of the data fields, a context or description of the data stored in each of the data fields, etc.).

In some implementations, a data structure can have a linear arrangement. For example, a data structure can include one or more arrays (e.g., a collection of data elements, each identified by a respective index or key). As another example, a data structure can include one or more linked lists (e.g., a collection of data elements in which element points to the next element in the linked list). As another example, data structure can include one or more data vectors having any number of dimensions (e.g., one, two, three, four, or more dimensions), each representing a different characteristic or parameter.

In some implementations, a data structure can have a hierarchical arrangement. For example, a data structure can include one or more hierarchical data trees.

In some implementations, a data can have other arrangements, such as a graph-based arrangement or a hash-based arrangement.

Although example data structures are described above, these are merely illustrative examples. In practice, computer systems can use any other data structure to process data, either instead or in addition to those described above.

In general, each of the computer systems 102 and **104*a*-104*n* can include any number of electronic devices that are configured to receive, process, and transmit data. Examples of the computer systems include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the computer systems can include computing devices that operate using one or more operating systems (e.g., Microsoft Windows, Apple macOS, Linux, Unix, Google Android, and Apple IOS, among others) and one or more architectures (e.g., x86, PowerPC, and ARM, among others). In some implementations, one or more of the computer systems need not be located locally with respect to the rest of the system 100**, and one or more of the computer systems can be located in one or more remote physical locations.

Each the computer systems 102 and **104*a*-104*n* can include a respective user interface that enables users interact with the computer system, other computer systems, and/or the Power-to-X optimization engine 150**. Example interactions include viewing data, transmit data from one computer system to another, and/or issuing commands to a computer system. Commands can include, for example, any user instruction to one or more of the computer system to perform particular operations or tasks. In some implementations, a user can install a software application onto one or more of the computer systems to facilitate performance of these tasks.

In FIG. 1, the computer systems 102 and **104*a*-104*n* are illustrated as respective single components. However, in practice, the computer systems 102 and 104*a*-104*n* can be implemented on one or more computing devices (e.g., each computing device including at least one processor such as a microprocessor or microcontroller). As an example, the computer system 102 can be a single computing device that is connected to the network 106, and the Power-to-X optimization engine 150 can be maintained and operated on the single computing device. As another example, the computer system 102 can include multiple computing devices that are connected to the network 106, and the Power-to-X optimization engine 150 can be maintained and operated on some or all of the computing devices. For instance, the computer system 102 can include several computing devices, and the Power-to-X optimization engine 150** can be distributed on one or more of these computing devices.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Figure 2:
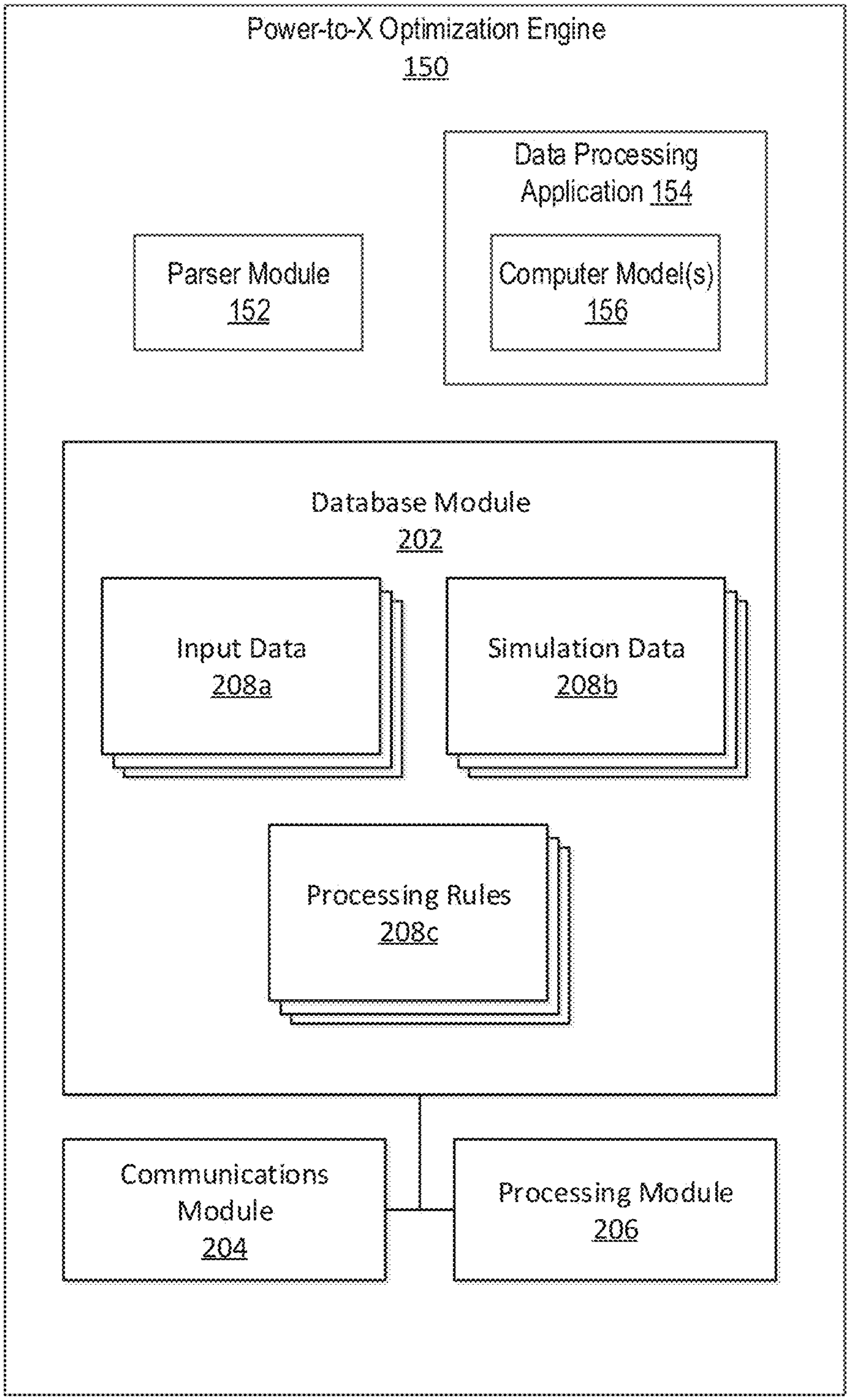
FIG. 2 is a diagram of an example Power-to-X optimization engine.

FIG. 2 shows various aspects of the Power-to-X optimization engine 150. In general, the Power-to-X optimization engine 150 includes several operation modules that perform particular functions related to the operation of the Power-to-X optimization engine 150. For example, the Power-to-X optimization engine 150 includes a parser module 152. Further, the Power-to-X optimization engine 150 includes a data processing application 154 implementing one or more computer models 156. Further, the Power-to-X optimization engine 150 includes a database module 202, a communications module 204, and a processing module 206. The operation modules can be provided as one or more computer executable software modules, hardware modules, or a combination thereof. For example, one or more of the operation modules can be implemented as blocks of software code with instructions that cause one or more processors of the Power-to-X optimization engine 150 to execute operations described herein. In addition or alternatively, one or more of the operations modules can be implemented in electronic circuitry such as, e.g., programmable logic circuits, field programmable logic arrays (FPGA), or application specific integrated circuits (ASIC).

The database module 202 maintains information related to optimizing the implementation and/or operation of a Power-to-X plant (e.g., the Power-to-X plant 170).

As an example, the database module 202 can store input data 208*a* that is used to generate an optimized configuration for a Power-to-X plant. In some implementations, the input data 208*a* can be similar to the input data 176 described with reference to FIG. 1.

In general, the input data 208*a* can represent one or more parameters for implementing and/or operating the Power-to-X plant 170. For instance, at least some of the input data 208*a* can represent parameters pertaining to the construction of a new Power-to-X plant 170 and/or modifying an existing Power-to-X plant 170. Further, at least some of the input data 208 can represent parameters pertaining to the operation of a Power-to-X plant 170. As an example, at least some of the input data 208*a* can specify the products 174 that can be produced by the Power-to-X plant 170, the demand for those products 174, the cost and the time associated with implementing the Power-to-X plant 170 (e.g., the cost and/or time associated with constructing and/or modifying the Power-to-X), the geographical location of the Power-to-X plant 170, and/or any other information pertinent to implementing and/or operating the Power-to-X plant 170. As another example, at least some of the input data 208*a* can specify historical and/or current market data for one or more products that can be produced by the Power-to-X plant 170 (e.g., an amount or volume of each product exchanged on a market, the price of each exchange, the time of the exchange, the location of that exchange, etc.).

In some implementations, at least some of the input data 208*a* can specify the processes that can be performed by the Power-to-X plant 170 to produce the products 174. As an example, in some implementations, the Power-to-X plant 170 can be configured to perform a water electrolysis process to produce hydrogen gas (e.g., by using electrical power to split water into oxygen and hydrogen). As another example, the Power-to-X plant 170 can be configured to perform a fuel production process. For instance, the Power-to-X plant 170 can be configured to produce methane (e.g., by using hydrogen, such as hydrogen produced by a water electrolysis process, and carbon dioxide to produce methane using a methanation reaction). As another example, the Power-to-X plant 170 can be configured to perform a chemical feedstock production process. For instance, the Power-to-X plant 170 can be configured to produce ammonia (e.g., by using hydrogen, such as hydrogen produced by a water electrolysis process, and nitrogen to produce ammonia using a Haber process or Haber-Bosch process). As another example, the Power-to-X plant 170 can be configured to produce methanol (e.g., by using hydrogen, such as hydrogen produced by a water electrolysis process, and carbon monoxide to produce methanol using one or more catalysts, such as copper and/or zinc oxides supported on alumina).

In some implementations, the Power-X-plat plan 170 can include one or more biogas plants. As an example, a biogas plant can be configured to produce biomethane and carbon dioxide using biomass (e.g., organic material from plants and/or animals) and electricity as inputs. In some implementations, the produced carbon dioxide can be used to produce methanol (e.g., as described above) for molecule production.

In some implementations, at least some of the input data 208*a* can specify the types of processes that can be performed, the inputs and outputs of such processes (e.g., input electricity, input materials, output materials, etc.), the time that would be needed to perform such processes, and/or the cost associated with such processes. Further, at least some of the input data 208*a* can specify an efficiency of each of these processes (e.g., the production yield of a product given a certain amount of inputted electrical power). Further still, at least some of the input data 208*a* can specify a degradation over time of each of these processes (e.g., a reduction of product yield and/or efficiency over time).

Further, the input data 208*a* can represent one or more aspects in which the Power-to-X plant 170 may be configured. For example, at least some of the input data 208*a* can specify an amount of electrical power (or a range of electrical power) that the Power-to-X plant 170 can receive from a power source (e.g., a power grid, on-site power generation, etc.). As another example, at least some of the input data 208*a* can specify the types of power sources from which the Power-to-X plant 170 receive electrical power (e.g., solar power generators, wind turbines, hydroelectric power generators, nuclear power generators, gas power generators, coal power generators, etc.). As another example, at least some of the input data 208*a* can specify the amount or volume of each product (or a range of amounts or volumes of each product) that can be produced by the Power-to-X plant 170. As another example, at least some of the input data 208*a* can specify the electric power storage capacity of the Power-to-X plant 170 (e.g., a battery storage capacity of the Power-to-X plant 170). As another example, at least some of the input data 208*a* can specify a product storage capacity of the Power-to-X plant 170 (e.g., a storage tank capacity of the Power-to-X plant 170 to store hydrogen gas, carbon dioxide, fuel, chemical feedstock, etc.). As another example, at least some of the input data 208*a* can specify the amount of electrical power that is needed to operate one or more of the components of the Power-to-X plant 170. For instance, at least some of the input data 208*a* can specify the amount of electrical power that is needed to produce one or more of the products described herein. Further, at least some of the input data 208*a* can specify the amount of electrical power that is needed to store one or more of the products described herein (e.g., by operating and maintaining the storage tanks, such as operating a compressor to push gasses, such as carbon dioxide, into the storage tanks).

In general, the Power-to-X plant 170 can be configured any number of ways, depending on the design choice of the operator. In some implementations, the input data 208*a* can represent the range of possibilities regarding the configuration of the Power-to-X plant 170 along multiple dimensions (e.g., a range of "optionalities" for designing and operating the Power-to-X plant 170). For example, the input data 208*a* can represent the range of possible inputs that the Power-to-X plant 170 could be configured to receive (e.g., the amount of electrical power, the input materials, etc. that the Power-to-X plant 170 could be configured to receive, in at least some configurations). As another example, the input data 208*a* can represent the types of power sources from which the Power-to-X plant 170 could be configured to receive electrical power. As another example, the input data 208*a* can represent the range of possible outputs by the Power-to-X plant 170 (e.g., the amount or volume of product that the Power-to-X plant 170 could be configured to receive, in at least some configurations). As another example, the input data 208*a* can represent the range of possible processes that could be performed by the Power-to-X plant 170. As another example, the input data 208*a* can represent the range of possible storage capacities of the Power-to-X plant 170 (e.g., the amount of electrical power and/or product that the Power-to-X plant 170 could be configured to have, at least some implementations). As another example, the input data 208*a* can represent different geographical locations at which the Power-to-X plant 170 could be deployed.

Further, database module 202 can store simulation data 208*b* for simulating or predicting an operation of the Power-to-X plant 170. For example, the simulation data 208*b* can include rules that specify that, given certain conditions, a Power-to-X plant 170 would be operated in a certain manner in response. For instance, the simulation data 208*b* can include rules that specify that, given certain inputs (e.g., available input electricity and input materials), market conditions (e.g., product or commodity prices on a market, demand for certain products, etc.), and/or environmental conditions (e.g., weather, solar activity, wind activity, etc.), a Power-to-X plant 170 would be operated to produce a certain amount or volume of one or more products in response. As another example, the simulation data 208*b* can include rules that specify that, given certain inputs, market conditions, and/or environmental conditions, a Power-to-X plant 170 would be operated to store a certain amount or volume of one or more products in response. As another example, the simulation data 208*b* can include rules that specify that, given certain inputs, market conditions, and/or environmental conditions, a Power-to-X plant 170 would be operated to transport a certain amount or volume of one or more products to another location in response.

Further, the simulation data 208*b* can include data to facilitate simulating or predicting the operation of the Power-to-X plant 170. For example, the simulation data 208*b* can represent test conditions or scenarios under which the Power-to-X plant 170 may operate. As an example, test conditions or scenarios can include one or more sets of historical and/or synthetic input data, market data, environmental data, etc.

Further, the database module 202 can store processing rules 208*c* specifying how data in the database module 202 can be processed to determine one or more optimized configurations for the Power-to-X plant 170.

For example, the processing rules 208*c* can include one or more rules for implementing and operating the parser module 152. For example, the one or more rules can specify that the parser module 152 (using the processing module 206) parse at least a portion of the input data 208*a* to identify one or more fields in the input data 208*a*, where each of the one or more fields represents a respective parameter and specifies a value of that parameter. Further, the one or more rules can specify that the parser module 152 generate one or more data structures representing the parsed data (e.g., to generate one or more data sets having at least a subset of the input data 208*a*).

As another example, the processing rules 208*c* can include one or more rules for implementing and operating the data processing application 154 to determine one or more optimized configurations for the Power-to-X plant 170 (e.g., using one or more computer models 156).

For example, the processing rules 208*c* can include one or more rules specifying that the data processing application 154 generate several data vectors from the input data 208*a*, each data vector representing a different respective candidate configuration of the Power-to-X plant 170.

Further, the processing rules 208*c* can include one or more rules specifying that the data processing application 154 input the data parsed by the parser module 152 and the generated data vectors into the computer model 156 in order to generate a digital representation of the Power-to-X plant. For example, the computer model 156 can represent each of the candidate configurations specified by the data vectors, and can represent how the Power-to-X plant 170 would be operated according to each of those candidate configurations.

Further, the processing rules 208*c* can include one or more rules specifying that the data processing application 154 simulate or predict a performance of the Power-to-X plant 170 according to each of the candidate configurations. For example, one or more rules can specify that, given certain subsets of the simulation data 208*b*, the Power-to-X plant 170 is predicted to operate in a particular manner (e.g., perform certain processes to produce certain products, store certain products, transport certain products to other locations, etc.).

Further, the processing rules 208*c* can include one or more rules specifying that the data processing application 154 select one or more of the candidate configurations based on the predicted or simulated performance.

For instance, one or more rules can specify that a Bayesian optimization process be performed to identify one or more of the candidate configurations that meet certain optimization criteria. As an example, the optimization criteria can include criteria pertaining to the expected financial performance of the Power-to-X plant 170 (e.g., generating the maximum profit, or generating a profit that otherwise satisfies a particular threshold). As another example, the optimization criteria can include criteria pertaining to the expected product output of the Power-to-X plant 170 (e.g., producing the maximum output, or producing an output that otherwise satisfies a particular threshold). As another example, the optimization criteria can include criteria pertaining to the expected efficiency of the Power-to-X plant 170 (e.g., producing products according to the highest efficiency, or producing products according to an efficiency that otherwise satisfies a particular threshold). As another example, the optimization criteria can include criteria pertaining to one or more objective functions (e.g., objective functions that define a particular score or metric representing a suitability or quality of a configuration, given certain inputs). Further details regarding a Bayesian optimization process are described below (e.g., with reference to FIGS. 5A-5C).

Further, the processing rules 208*c* can include one or more rules specifying that the data processing application 154 generate and store a data set (e.g., a data structure) representing the selected candidate configurations.

Example data processing techniques are described in further detail below.

As described above, the Power-to-X optimization engine 150 also includes a communications module 204. The communications module 204 allows for the transmission of data to and from the Power-to-X optimization engine 150. For example, the communications module 204 can be communicatively connected to the network 106, such that it can transmit data to and receive data from each of the computer systems 104*a*-104*n*. Information received from these computer systems can be processed (e.g., using the processing module 206) and stored (e.g., using the database module 202).

As described above, the Power-to-X optimization engine 150 also includes a processing module 206. The processing module 206 processes data stored or otherwise accessible to the Power-to-X optimization engine 150. For instance, the processing module 206 can be used to execute one or more of the operations described herein (e.g., operations associated with the parser module 152, data processing application 154, computer models 156, etc.).

In some implementations, a software application can be used to facilitate performance of the tasks described herein. As an example, an application can be installed on the computer systems 102 and/or 104*a*-104*n*. Further, a user can interact with the application to input data and/or commands to the Power-to-X optimization engine 150, and review data generated by the Power-to-X optimization engine 150.

Figure 3:
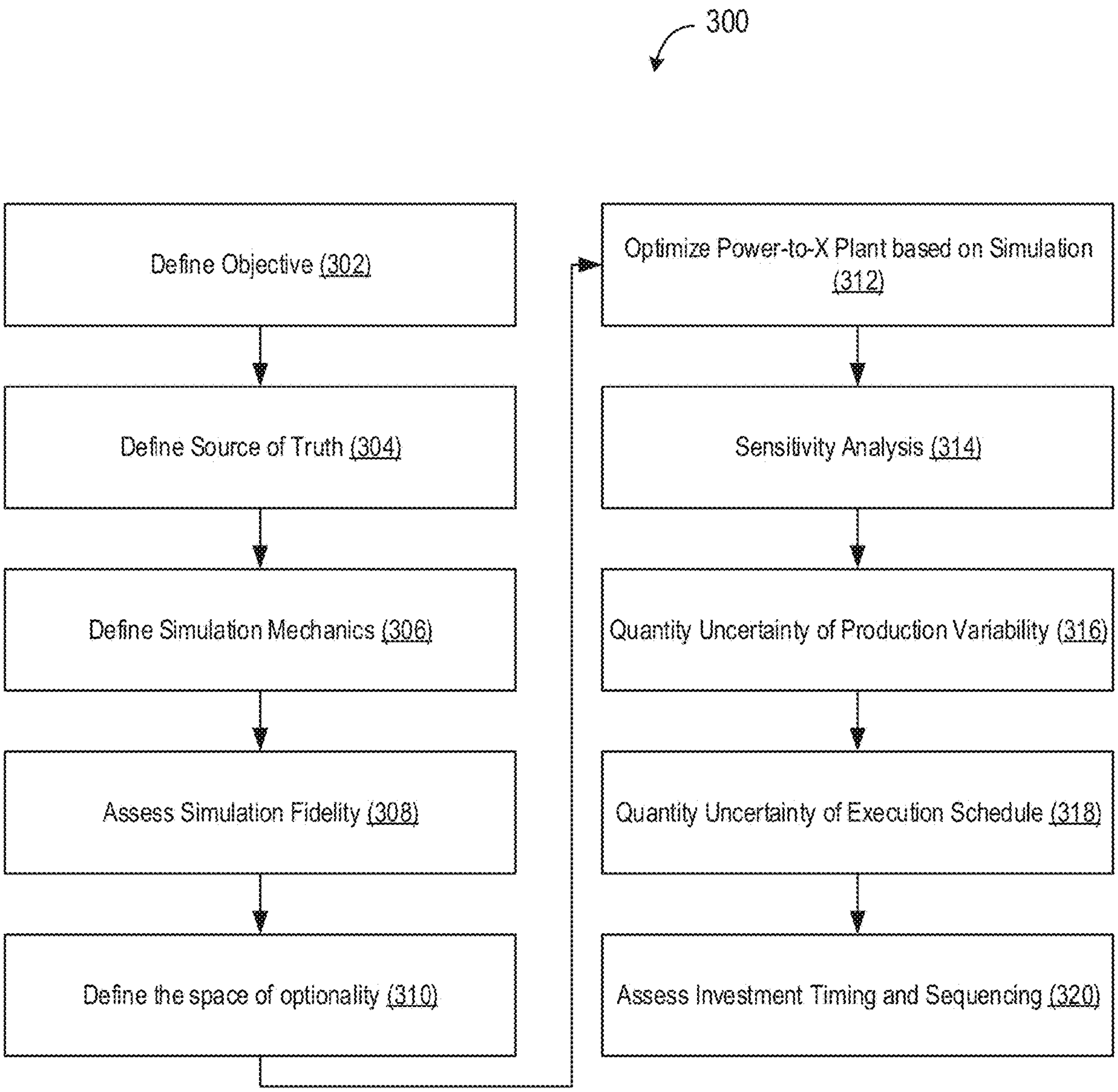
FIG. 3 is a flow chart diagram of an example process for optimizing an implementation and/or operation of a Power-to-X plant.

FIG. 3 shows an example process 300 for determining one or more optimized configurations for a Power-to-X plant. In some implementations, the process 300 can be performed at least in part by the system 100 (e.g., at least in part by the Power-to-X optimization engine 150.

According to the process 300, one or more objectives for implementing and operating a Power-to-X plant are defined (block 302). As an example, an objective can include producing a certain amount or volume of product in a certain amount of time (e.g., producing X tons of a given fuel in a certain year). As another example, an objective can include decarbonizing the operations of a particular entity or organization (e.g., an entity or organization that is implementing and/or operating the Power-to-X plant). As another example, an objective an include entering a given market (e.g., a market for exchanging products that are produce by the Power-to-X plant). In some implementations, defining these objectives can be beneficial, for example, in identifying at least some initial candidate configurations for the Power-to-X plant.

Further, a source of truth is defined with respect to the Power-to-X plant (block 304). In general, the process of developing a Power-to-X plant relies on a large amount of data. To unify this data, a single source of truth (e.g., a source of "ground truth" data) can be developed at the beginning of the project, from which a system (e.g., the system 100) and/or its users can source various assumptions, parameters, and/or input data. As an example, this single source of truth can store data regarding each category of assets that are associated with a Power-to-X plant (e.g., solar panels, wind turbines, electrolyzers, storage tanks, etc.), demand scenarios (e.g., product price, volume, category, etc.), regulatory structure (e.g., power purchase agreement characteristics, green $H_2$ regulation characteristics, etc.), and/or other data that may be relevant to the project.

Further, simulation mechanics for simulating or predicting an operation of the Power-to-X plant are defined (block 306). In general, a simulation model enables the system and/or its users to evaluate techno-economic and technical outcomes regarding the Power-to-X plant as a function of all design decisions that were made (e.g., what assets to build, what revenue streams to address, etc.). In some implementations, an initial step can include setting up simulations by specifying the objective or multiple objectives to be maximized (e.g., internal rate of return (IRR), energy production level, total cost ownership (TCO), and/or any other objectives) and the revenue streams that may result from the Power-to-X plant. In some implementations, an additional step can include specifying the constraints specific to the Power-to-X plant. As an example, a Power-to-X plant's geographic location can determine which regulatory market with which the Power-to-X plant can interact with a power grid).

Further, the system assesses the fidelity of the simulation (block 308). In general, at the onset of a Power-to-X project, users may have an initial design for the Power-to-X plant (e.g., a rough design or initial starting point based on the defined objectives, as discussed with respect to block 302). This design can be used by the system and/or the users has a baseline to test if the simulation reflects expected real-time phenomena to a sufficiently accurate degree.

Figure 4A:
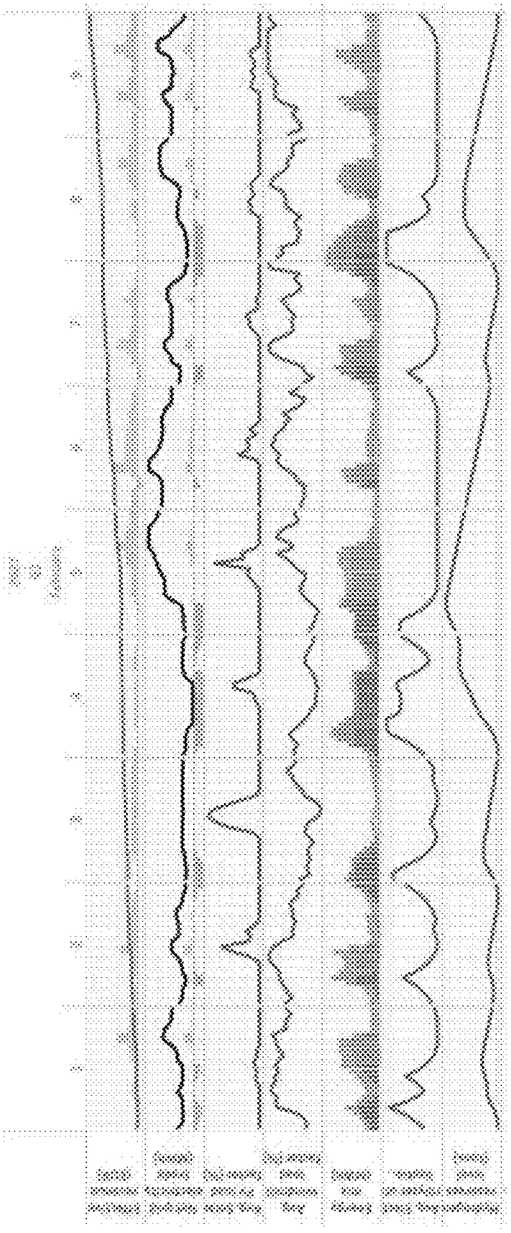
FIGS. 4A-4G are diagrams showing various aspects of the operating of a Power-to-X optimization engine.

As an example, FIG. 4A shows a plot 400 representing example input and output data for a computer model for simulating the operation of a methanol production process (e.g., a Power-to-X production process that uses input electrical power to produce methanol). In this example, a constant throughput of hydrogen is needed for the methanol production process. As shown in FIG. 4A, as a result, the Power-to-X plant requires imports of electrical power from the grid, as its own renewable capacity does not cover the needs of the plant in winter. Anticipating the electricity price rises on February $5^{th}$ and $6^{th}$, the computer model determines that on February $4^{th}$, the Power-to-X plant will import electricity to run the electrolyser at full capacity and to store hydrogen in a storage tank. As a result, the Power-to-X plant then benefits from high prices of electrical power to sell its own electrical power generation on February $5^{th}$ and $6^{th}$, lowering electrolyzer needs and depleting the storage tank.

Figure 4B:
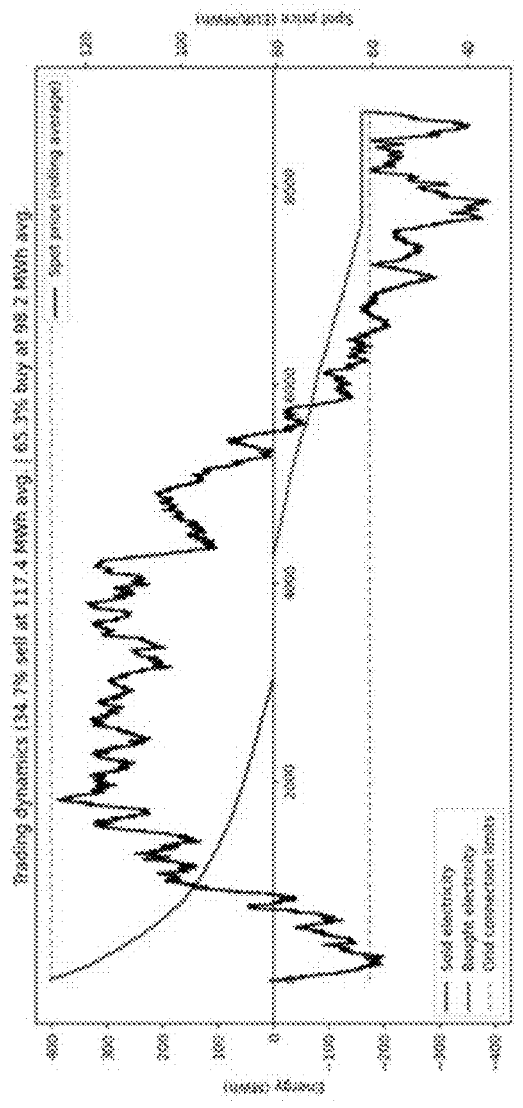

As another example, FIG. 4B shows a plot 410 representing estimated imports and exports of electrical power by a Power-to-X plant over time, and the market spot price for electrical power (e.g., as generated by a computer model and/or based on input data). This information can be used by the system and/or users to determine whether the operational choices of the computer model are economically rationale.

Further, the space of optionality for implementing and operating the Power-to-X plant are determined (block 310). In general, Power-to-X projects can take multiple forms, and the optimal design of a Power-to-X plant (e.g., the combination of assets of different types, technology, and geography) will differ from case to case. In this step, the system and/or users can specify the space of "optionality" for each asset in terms of technology and capacity (e.g., defined in relevant units, such as Watts, tons of molecules produced per time unit, etc.).

Figure 4C:
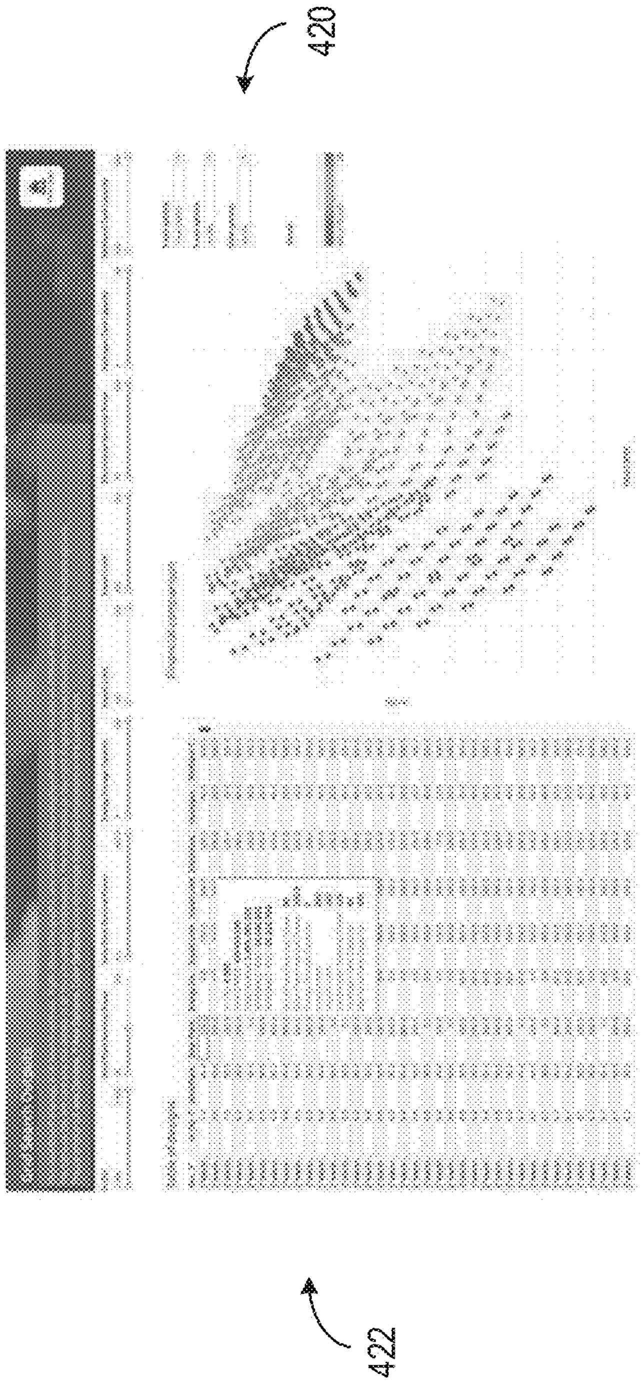

Further, the configuration or design of a Power-to-X plant is optimized based on the simulation (block 312). In general, the system can use Bayesian Optimization to determine, in the space of optionality, the design or configuration of the Power-to-X plant that provides the best (or otherwise acceptable) simulated techno-economic outcome. As an example, FIG. 4C shows a visual representation 420 of the space of optionality of possible (or "candidate") configurations of a Power-to-X plant distributed according to their internal rate of return (IRR) and total capital expenditure. Specific configurations are displayed in the list 422. Further, the system selects one or more of the configurations that maximizes (or otherwise satisfies) the selected objective.

In some implementations, multiple objectives can be provided to the system. In some implementations, these objectives can be either optimized in a lexicographic order (e.g., "maximizing Objective 1 until it reaches desired level X, and next maximizing Objective 2 under the condition that Objective 2 is at least at level X," and so on). In some implementations, an optimal tradeoff frontier can be provided to the system and/or the users to select the most suitable design.

In some implementations, one or more of the operations of the process 300 can be performed multiple times (e.g., iteratively) to refine the optimization process (e.g., to account for new information and/or a new understanding of the optimization parameters and goals). For example, for each iteration, a different respective objective and/or different respective source of truth can be defined (blocks 302 and/or 304). Further, based on the defined objective and source of truth, the operations of blocks 306, 308, 310, and 312 can be performed to determine one or more corresponding optimized configurations for the Power-to-X plant. In practice, one or more of the operations of the process 300 can be can be performed any number of times to determine any number of optimized configurations for the Power-to-X plant.

Once one or more optimized configurations for the Power-to-X plant have been obtained, several additional operations can be performed by the system to assess the optimized configurations.

Figure 4D:
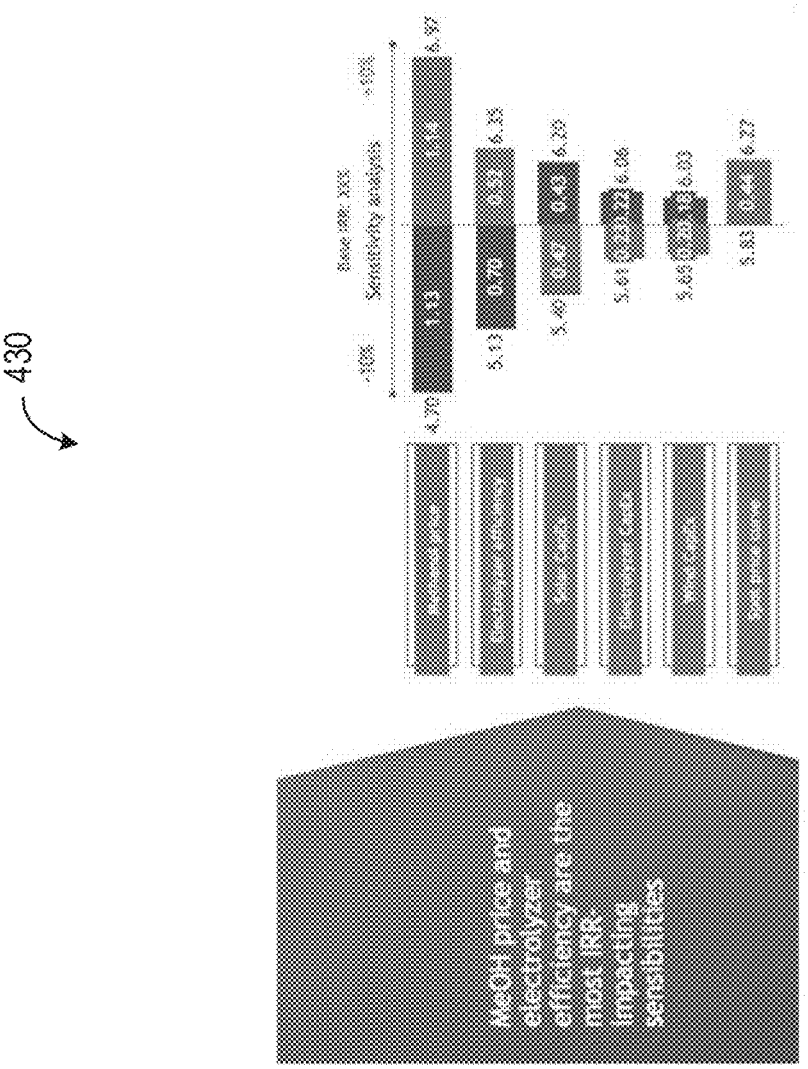

For example, the system can analyze the sensitivity of the simulation (block 312). In general, this analysis can include assessing or more of the performance measures of the configurations in case one of the key input parameters (e.g., operating costs, technological efficiency, etc.) change. Sensitivity analyses can be beneficial, for example, in enabling users to understand the impact on selected parameters of the plant configuration or commercial construct on the broader business model. As an illustrative example, FIG. 4D shows an exemplary tornado chart analysis 430 assessing what parameters impact most the IRR of a Power-to-X project. Users can use these values to better understand which "levers" they will need to find (e.g., operations that can be performed, modifications that can be made to the Power-to-X plant configuration, etc.)) to improve their business models and/or other outcomes.

As another example, the system can quantify the uncertainty of production by the Power-to-X plant (block 316). In general, a key element of uncertainty of Power-to-X projects comes from the variability of production due to intermittency of renewable power. In view of this uncertainty, the system can perform simulations multiple times with different trajectories of power price profiles (e.g., different price profiles for wind, solar, and electricity). Based on these probabilistic production profiles, the system can integrate the variability of output into the sales contracts presented to the potential off-takers (e.g., entities purchasing the produced products).

Further, the system quantifies the uncertainty of the execution schedule of the Power-to-X plant (block 318). In general, the risks related to delays in the execution schedule and/or the costs associated with executing the schedule (e.g., construction costs on a per-asset basis) are quantified so that users are provided with an investment risk assessment. In some implementations, a separate computer model can use the design of the Power-to-X plant as an input to build an execution schedule. Further, Reference Class Forecasting methodology and/or inputs from expert users can be used to insert delay uncertainty for each asset. Further, the computer model can combine the delay risks, considering the sequential construction of the Power-to-X plant. The probabilistic delays can help inform users working on preparing off-taker contracts to introduce terms on potential delay of first deliveries to construction delays.

Further, the system assesses a timing and sequencing of investments with respect to the Power-to-X plant (block 320). In general, this operation can facilitate improvement of the business model of a Power-to-X project by examining how to best phase execution using real option valuation methodology. For example, scenario trees can be generated (e.g., branching every five years for the first 15 years) that will enable evaluation of investment options across multiple evolving world scenarios. Example world scenarios include materialization of a demand for a specific product (e.g., ammonia for shipping), decreasing cost of a technology, scalability of new technology, availability of raw materials or technology assemblies, and many others. At each branching of the world scenario into different sub-scenarios, the computer model can evaluate different optimal updates to the configuration of the Power-to-X plant (e.g., new capital expenditure investments) to improve the business model for the Power-to-X project.

In some implementations, the output of this operation can include data representing a selected set of recommended investment options for current (e.g., "here-and-now" investment decisions).

Figure 4E:
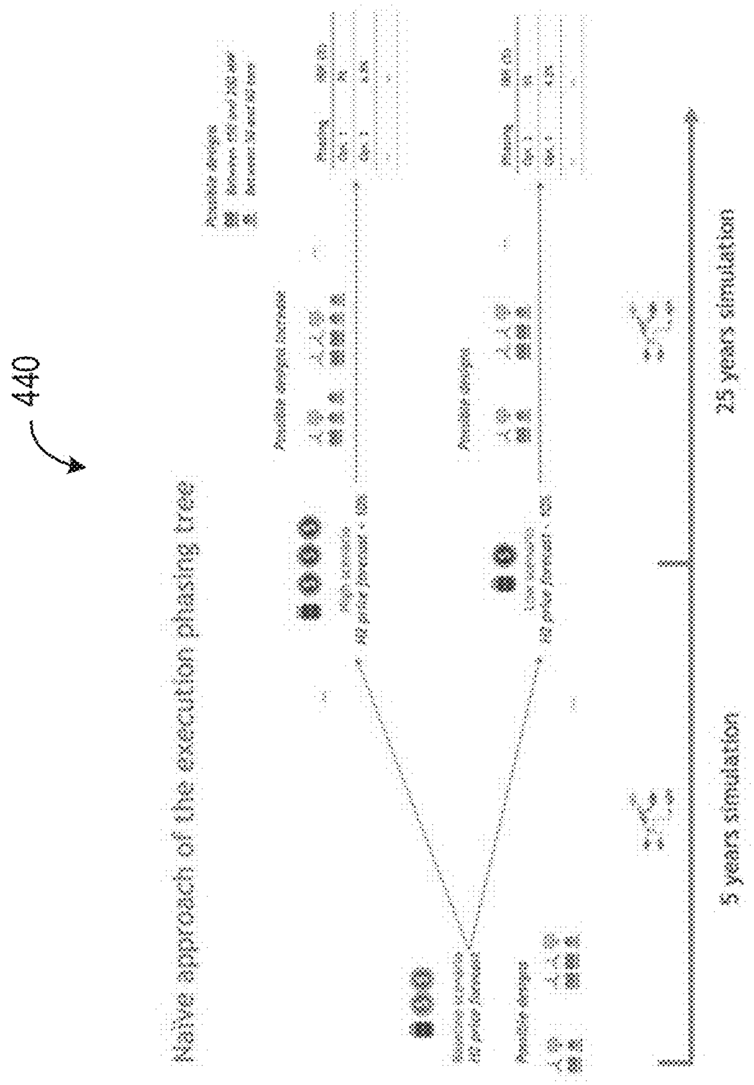

As an example, FIG. 4E shows a tree 440, which depicts a simplified example of two different scenarios with respect to low carbon hydrogen price trajectories. In the scenario denoted as "high," the decision maker's best strategy is to expand the Power-to-X plant to take advantage of the higher hydrogen prices. In the scenario denoted as "low," no such expansion takes place. Considering such adaptations to the possible world scenarios helps users make an informed choice whether to build the entire Power-to-X plant at the very beginning, or to expand the Power-to-X in incremental stages over time, as more information becomes available.

Example Computer Models

As described above, one or more computer models can be used to perform at least some of the operations described herein. As an example, one or more computer models can be used to simulate or predict a performance of the Power-to-X plant according to each of several candidate configurations, and to select one or more candidate configurations from among the candidate configurations based on the predicted performance.

In some implementations, a computer model can use a configuration or design of a Power-to-X plant as a fixed input, and assess the performance of the Power-to-X plant over a particular time horizon (e.g., hours, days, months, years, etc.). Further, the computer model can perform these simulation or predictions under the assumption of economically rational operation. For example, the computer model can receive the following as inputs:

(i) a list of assumptions for operating rules of the Power-to-X plant, and (ii) one or more testing scenarios (e.g., based on expert input, quantitative analysis, historical data, synthetic data, etc.) for weather, prices, and/or any other dynamic elements (e.g., plant unplanned maintenance, etc.).

In general, an important element of an Power-to-X optimization process is a realistic simulation of the optimal operation of a Power-to-X plant over a given time horizon. Optimizing simultaneously for all operational decisions throughout the entire time horizon would be (i) computationally inefficient and/or (ii) bias the results by assuming knowledge of future spot prices and/or other information. To provide a more realistic setup and to achieve higher computational performance, the optimization problem can be split in multiple time windows (e.g., sequential repeating time intervals that span at least a portion of the time horizon). For these of the time windows, the computer model can determine optimal actions that can be performed with respect to the Power-to-X plant within that time window only, based on then-available short-term forecasts of future spot prices and/or other then-available information, as would be the case in a real-life daily operation. As an example, the computer model can simulate or predict operational decisions relating to the input of electrical power and/or materials into the Power-to-X plant, the performance of production processes to produce products using the electrical power and/or materials, the storage of the produced products, etc. As another example, the computer model can simulate or predict operational decisions regarding the types of electrical power that are input into the Power-to-X plant (e.g., solar power, wind power, and/or any other types of power) and/or the amount of power that is input into the Power-to-X plant.

In some implementations, the computer model can operate according three assumptions:

(i) Imperfect forecast: the computer model can be configured to receive information regarding the solar activity, wind activity, and commodity price profiles that will happen. However, at each short-term time horizon (e.g., at each individual time window), users may have at their disposal only an imperfect and limited look-ahead forecast of these parameters, for which operational decisions can be optimized.

(ii) Limited Horizon: The computer system can simulate or predict operations by solving over a "rolling horizon" of a short operational timespan (e.g., a short time window of the total time horizon) to mimic limited foresight experienced during daily operations.

(iii) Gross profit optimization: In each of the short-term time horizons, the computer model can simulate or predict hourly operations conducted to maximize gross profits over the considered short-term time horizon, under the assumed forecasts.

Figure 4F:
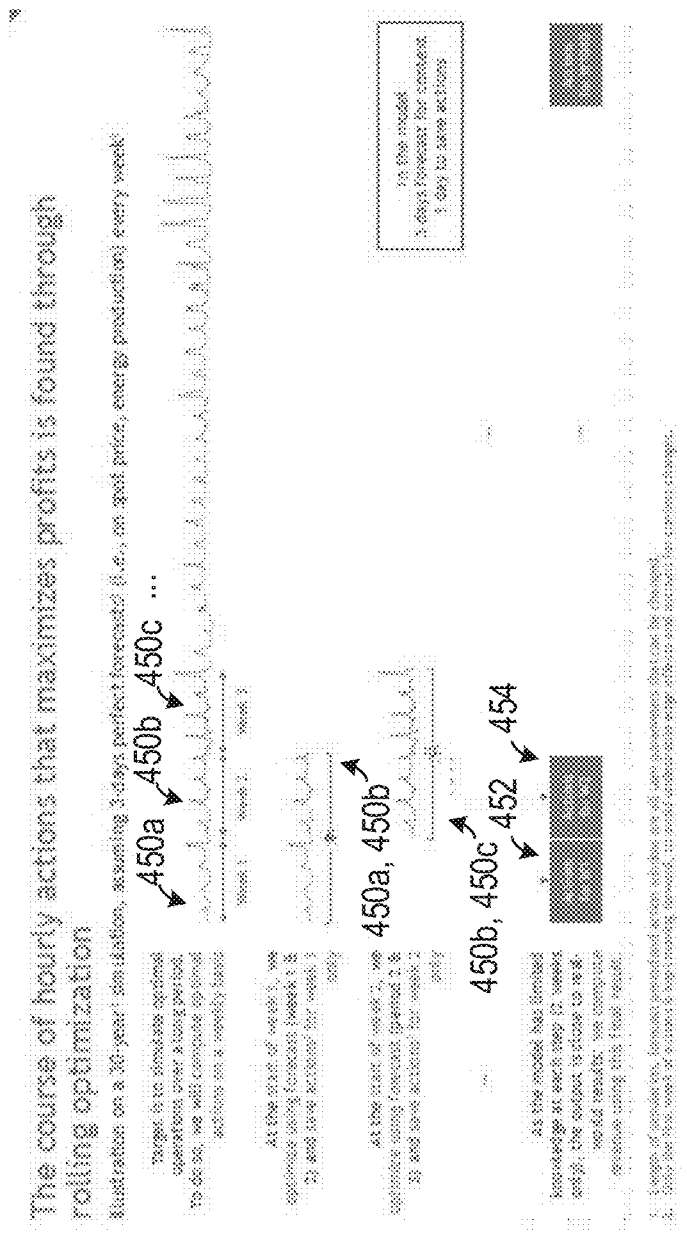

As an illustrative example, FIG. 4F shows a visual representation of a rolling-horizon simulation. In this example, a computer model simulates or predicts the operation of a Power-to-X plant over a 30 year time horizon, assuming perfectly accurate 3-day forecasts every week (e.g., forecasts with respect to spot price, energy production, etc.).

To perform such a simulation, the computer model divides the 30 year time horizon into a repeating sequence of time windows 450*a*-450*n* (e.g., three days, or some other time window). Further, the computer model simulates the operation of the Power-to-X plant for the first time window 450*a* and the second time window 450*b*, using forecast information regarding the first time window 450*a*. The computer model records any simulated actions 452 that are performed with respect to the Power-to-X plant during the first time window 450*a* (and not the simulated actions that were performed during the second time window 450*b*), and moves onto the second time window 450*b*.

For the second time window 450*b*, the computer model simulates the operation of the Power-to-X plant for the second time window 450*b*, using forecast information regarding the second time window 450*b* and the simulated actions that were performed during the first time window 450*a*. The computer model records any simulated actions 454 that are performed with respect to the Power-to-X plant during the second time window 450*b* (and not the simulated actions that were performed during the third time window 450*b*), and moves onto the third time window 450*c*.

This process is performed sequentially for each of the time windows 450*a*-450*n* (e.g., three-days by three-days, until the full 30-year time window has been simulated).

As described above, although the computer model can simulate actions that are performed with respect to the Power-to-X Plant over a particular time frame (e.g., three days), the computer model can record along the simulated actions for a subset of that time frame (e.g., the first day). This can be beneficial, for example, in mimicking imperfect forecasts and a limited horizon of actual daily operations, while also avoiding (or minimizing) undesirable edge effects an account for context changes (e.g., changes in the environment of the Power-to-X plant, market changes, etc.).

Although example time horizons and time intervals are described above, in practice, other time horizons and/or time interval can be used either instead or in addition to those described above.

Figure 4G:
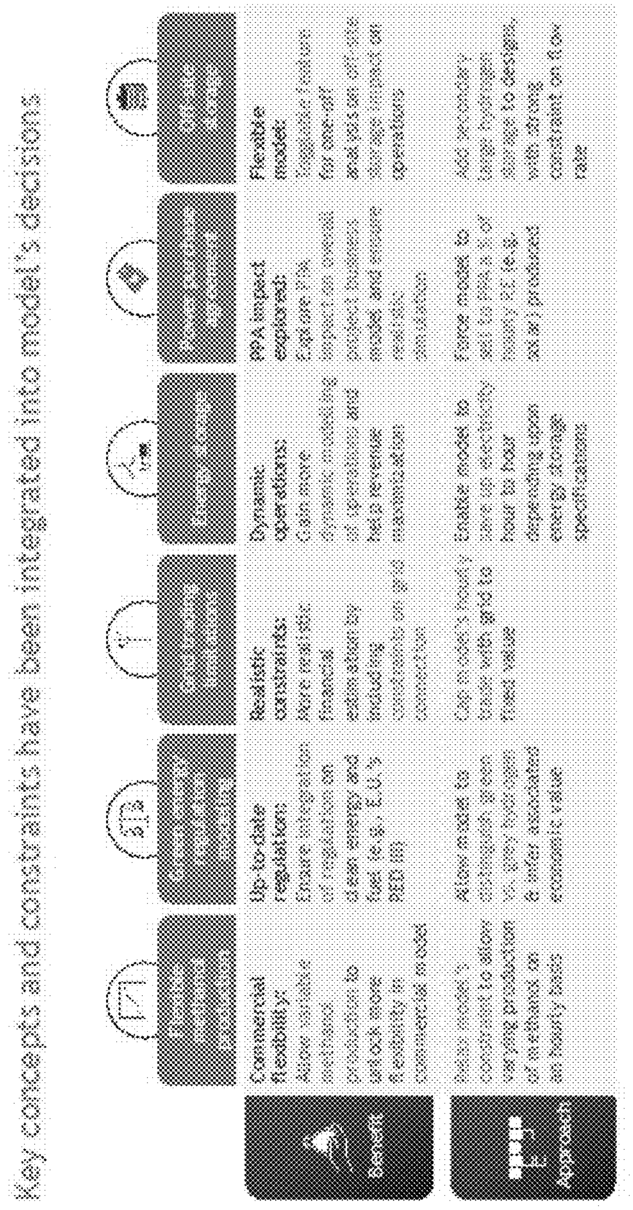

In general, a computer model can include one or more constraints to improve the simulation or predict accuracy of the computer model. Example constraints shown in FIG. 4G.

As an example, with reference to methanol production, one or more constraints of the computer model can be relaxed to allow varying production of methanol over time (e.g., on an hourly basis). This can be beneficial, for example, since allowing for variable methanol production can provide greater flexibility in a commercial model.

As another example, with respect to green energy regulation modeling, the computer model can be configured to distinguish green hydrogen (e.g., hydrogen produced with zero emissions, such as using renewable energy) from grey hydrogen, (e.g., hydrogen produced using non-renewable energy, such as coal or gas), and infer associated economic value of each. This can be beneficial, for example, in integrating the regulation of clean energy and fuel into the computer model.

As another example, with respect to power grid trading limitations, the computer model can be configured to cap hourly trading of electrical power with a power grid to a fixed value. This can be beneficial, for example, in providing more realistic financial estimations (e.g., by considering constraints on the power grid connections).

As another example, with respect to energy storage, the computer model can be configured to save up electricity hour to hour depending upon energy storage specifications. This can be beneficial, for example, in facilitating more dynamic modeling of operations and to facilitate revenue maximization.

As another example, with respect to power purchase agreements, the computer model can be configured to sell to a third party (e.g., in accordance with the power purchase agreements) a certain percentage of hourly produced renewable energy (e.g., solar energy). This can be beneficial, for example, in simulating the impact of a power purchase agreement on the overall project business model and to improve the accuracy of the simulation.

As another example, with respect to off-site storage, the computer model can be configured to add secondary large hydrogen storage tanks to Power-to-X plant designs, with strong constraints on flow rate to those storage tanks. Further, this feature can be toggled on and off (e.g., to provide a one-off analysis on the impact of off-site storage to the operation of a Power-to-X plant).

Example Bayesian Optimization Process

Figure 5A:
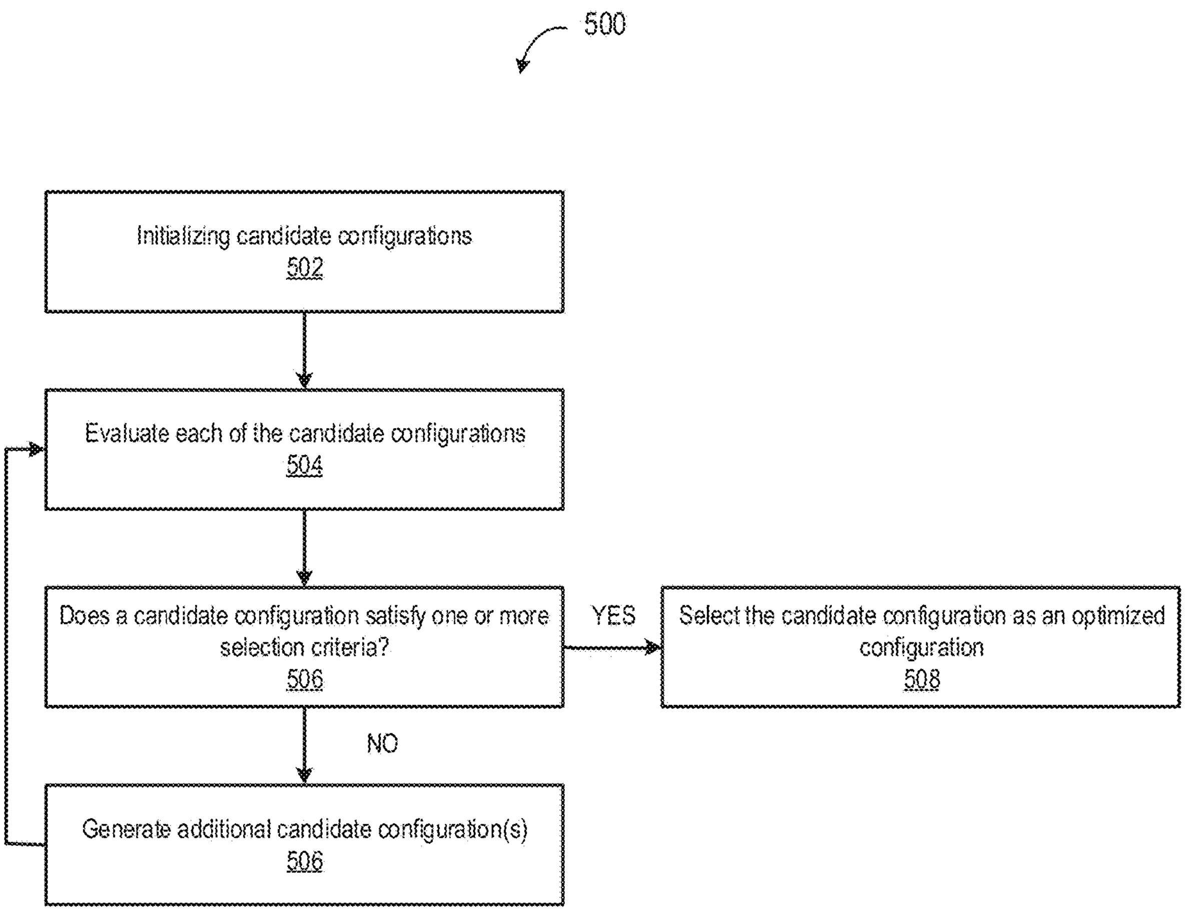
FIGS. 5A-5C are diagrams showing various aspects of a Bayesian optimization process.

As described above, a configuration for a Power-to-X plant can be optimized using a Bayesian optimization process. An example Bayesian optimization process 500 is shown in FIG. 5A.

According to the process 500, a system (e.g., the Power-to-X optimization engine 150) initializes a set of candidate configurations for the Power-to-X plant (block 502). In some implementations, at least some of these candidate configurations can be randomly generated by the system (e.g., by generating a data vector representing each of the candidate configurations, and randomly selecting parameters or values for one or more of the dimensions of the data vector). In some implementations, at least some of these candidate configurations can be manually specified by a user (e.g., by generating a data vector representing each of the candidate configurations, and manually selecting parameters or values for one or more of the dimensions of the data vector).

Further, the system evaluates the performance of each of the candidate configurations (block 504). For example, the system can simulate and/or predict the performance of the Power-To-X plant according to each of the candidate configurations, using one or more of the techniques described herein. In some implementations, the system can generate one or more performance metrics representing the performance of the Power-to-X plant according to each of the candidate configurations.

Further, the system determines whether any of the candidate configurations satisfies a particular set of selection criteria (block 506). For example, the system can determine whether any of the candidate configurations has a performance metric that exceeds a particular threshold values (e.g., indicating that the candidate configuration is sufficiently optimized). If so, the system can select those candidate configuration(s) as the optimized configuration(s) for the Power-to-X plant (block 508).

However, if not, the system can generate one or more additional candidate configurations based on the previous evaluation of the candidate configurations (block 510). In general, the system can generate additional candidate configuration(s) that are likely to be better than those that have already been evaluated.

As an example, in general, the performance of the Power-to-X plant can be presented by an objective function having one or more inputs (e.g., representing one or more dimensions of the configuration). However, the precise objective function is not known to the system (e.g., due to the complex relationship between the configuration of the Power-to-X plant and its resulting performance, and the large extent of unknowns).

Instead, the system generates a prediction of the objective function, based on the previously performed evaluations. For example, the system can generate a predicted mean of the objective function, given particular inputs. As another example, the system can generate a predicted confidence interval of the objective function, given particular inputs.

Based on the predicted objective function, the system can identify one or more input parameters (e.g., corresponding to particular configurations of the Power-to-X plant) that are likely to improve the performance of the Power-to-X plant. For example, the system can identify one or more inputs that would result in an increase of the output of the predicted objective function, and generate one or more additional candidate configurations based on those inputs.

In some implementations, the system can generate an acquisition function representing the areas in the domain of the objective function to evaluate or "exploit" next (e.g., to obtain additional knowledge regarding the objective function). In some implementations, the system can generate a new candidate configuration by determining the maximum of the equation function, and the corresponding inputs to the objective function as parameters for the new candidate configuration.

Figure 5B:
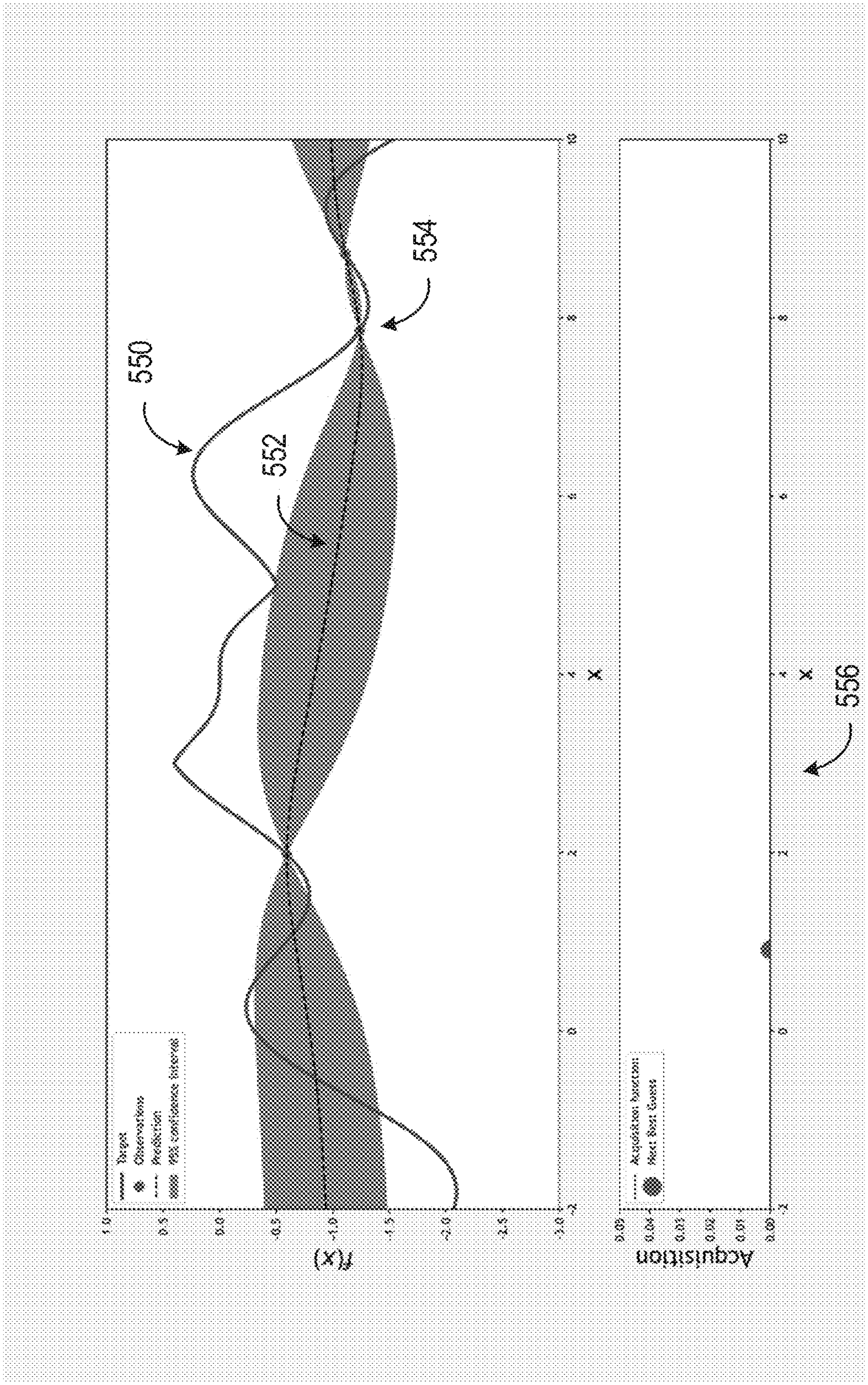

FIG. 5B shows simplified examples of an objective function 550, a predicted objective function 552, and an acquisition function 556. The mean of the predicted objective function 552 is indicated using a dashed line. Further, the confidence interval of the predicted objective function 552 is indicated using shading. Previously evaluated parameters are represented by circles 554.

The newly generated candidate configuration(s) are evaluated (block 504). If any of the newly generated candidate configurations satisfies the set of selection criteria, those candidate configurations are selected as optimized configurations (blocks 506, 508). Otherwise, additional candidate configurations are generated (block 510), and the process repeats until an optimized configuration is selected.

In general, a Bayesian optimization process can beneficial in identifying an optimization configuration in a computationally efficient manner (e.g., compared to evaluating each and every possible configuration using brute force techniques). Further, a Bayesian optimization process can also be more computationally efficient to implement compared to a random grid evaluation process (e.g., in which configurations are tested at random until a suitable configuration is found).

Figure 5C:
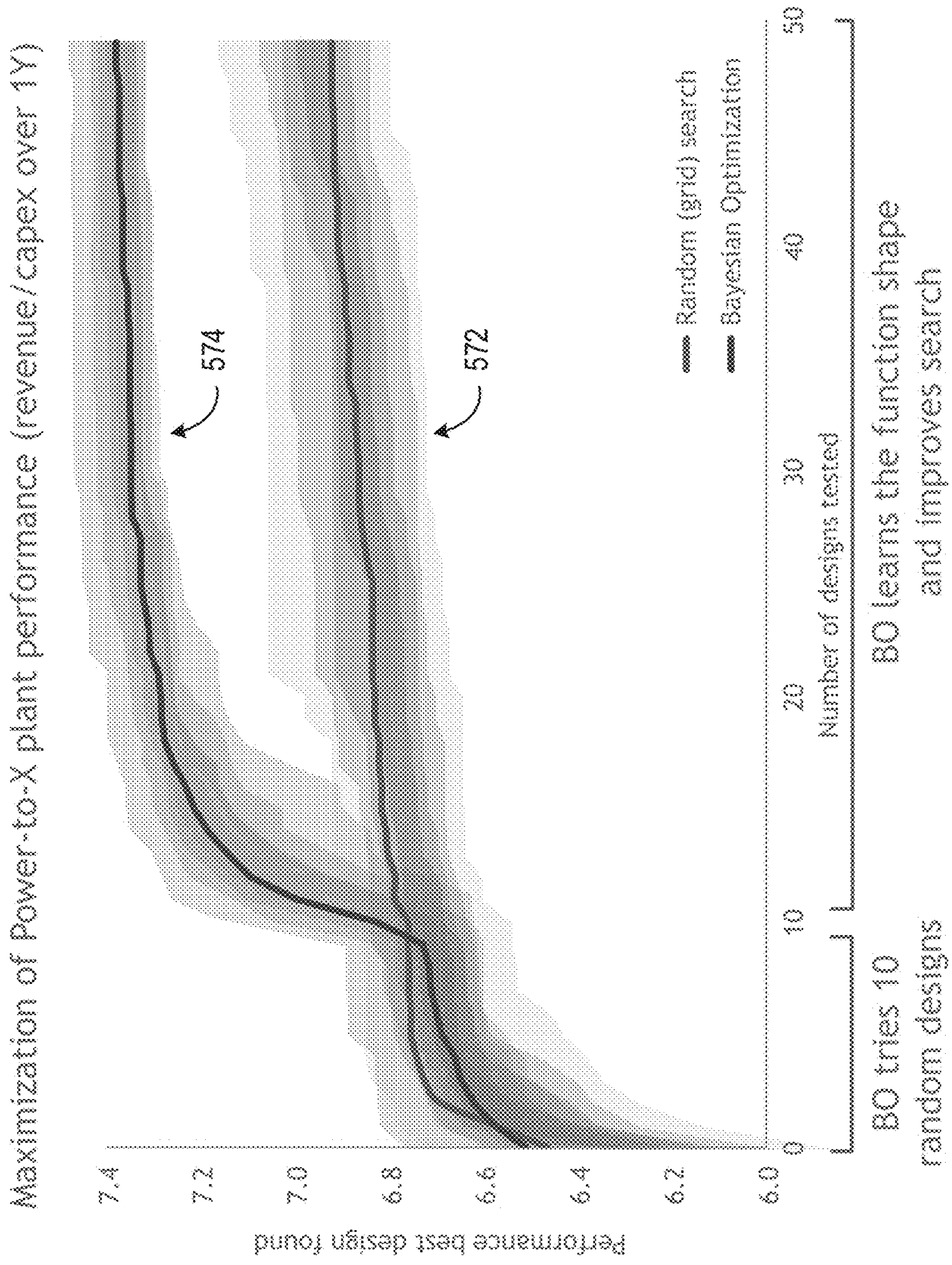

For example, FIG. 5C depicts an example performance of a Power-to-X plant that has been optimized according to a random grid evaluation process (plot 572) and a Bayesian optimization process (plot 574). As shown in FIG. 5C, after several iterations of evaluation, the performance of the Power-to-X plant is substantially greater when optimized using the Bayesian optimization process than with the random grid evaluation process.

Example Processes

FIG. 6 shows an example process 600 for example process for optimizing the implementations and/or operation of a Power-to-X plant. In some implementations, the process 600 can be performed by the system 100 described in this disclosure (for example, the system 100 including the Power-to-X optimization engine 150 shown and described with reference to FIGS. 1 and 2) using one or more processors (for example, using the processor or processors 710 shown in FIG. 7).

In the process 600, a system accesses, from one or more hardware data storage devices, a first data set representing one or more parameters for implementing and operating a Power-to-X plant (602).

In some implementations, the first data set can represent one or more types of production processes of the Power-to-X plant. For example, the one or more types of production processes can include at least one of: a water electrolysis process, a fuel production process, or an ammonia production process.

In some implementations, the first data set can represent, for each of the one or more types of production processes, at least one of: a cost associated with implementing that type of production process at the Power-to-X plant, a time associated with implementing that type of production process at the Power-to-X plant, a demand for products produced by that type of production process at the Power-to-X plant, an efficiency of that type of production process at the Power-to-X plant, a degradation over time of that type of production process at the Power-to-X plant, or a geographical location of the Power-to-X plant.

The system determines one or more configurations of the Power-to-X plant based on the first data set and a Bayesian optimization process (604). In general, the system can perform one or more of the following operations to determine the one or more configurations.

The system parses, using a parser module, the first data set to identify one or more fields in the first data set. Each of the one or more fields represents a respective parameter and specifies a value of that parameter.

The system generates a plurality of data vectors representing respective first candidate configurations of the Power-to-X plant.

The system inputs the data vectors and the first data set into a data processing application for executing a computer model. The computer model is configured to provide a digital representation of the Power-to-X plant.

The system predicts, based on the execution of the data processing application, a performance of the Power-to-X plant according to each of the first candidate configuration.

The system generates, using the Bayesian optimization process, one or more second candidate configurations based on the predicted performance.

Further, the system generates a second data set representing the one or more configurations of the Power-to-X plant (606).

The system also stores the second data set using the one or more hardware data storage devices (608).

Implementations of this aspect can include one or more of the following features.

In some implementations, the process 600 can also include causing a graphical user interface to be presented to a user. The graphical user interface can include one or more first user interface elements representing the one or more configurations of the Power-to-X plant. Further, the graphical user interface can include one or more second user interface elements representing an output of the computer model.

In some implementations, predicting the performance of the Power-to-X plant can include determining a first set of forecast data representing at least one of a forecasted market condition or a forecasted environmental condition during a first time interval; simulating, using the computer model, a first operation of the Power-to-X plant during the first time interval based on the first set of forecast data; and determining an output of the Power-to-X plant during the first time interval based on the simulated first operation.

In some implementations, the first set of forecast data can represent at least one of: a forecasted solar activity during the first time interval, a forecasted wind activity during the first time interval, a forecasted commodity price during the first time interval.

In some implementations, predicting the performance of the Power-to-X can further include: determining a second set of forecast data representing at least one of a forecasted market condition or a forecasted environmental condition during a second time interval subsequent to the first time interval; simulating, during the computer model, a second operation of the Power-to-X plant during the second time interval based on the second set of forecast data; and determining an output of the Power-to-X plant during the second time interval based on the simulated second operation.

In some implementations, predicting the performance of the Power-to-X plant can include: determining a plurality of consecutive time intervals; and for each of the time intervals: determining a set of forecast data representing at least one of a forecasted market condition or a forecasted environmental condition during that time interval, simulating, using the computer model, an operation of the Power-to-X plant during that time interval based on the set of forecast data, and determining an output of the Power-to-X plant during that time interval based on the simulated operation.

In some implementations, determining the one or more configurations can include: determining one or more objective functions representing the performance of the Power-to-X plant; determining one or more selection criteria with respect to the one or more objective functions; and determining, using the Bayesian optimization process, the one or more of the first and/or the second candidate configurations that satisfy the one or more selection criteria.

In some implementations, each of the first and the second candidate configurations of the Power-to-X plant can represent at least one of: an amount of power received by the Power-to-X plant from one or more power sources, an energy storage capacity of the Power-to-X plant, an amount of power input to one or more water electrolyzers of the Power-to-X plant, a hydrogen storage capacity of the Power-to-X plant, a fuel storage capacity of the Power-to-X plant, or an ammonia storage capacity of the Power-to-X plant. In some implementations, the one or more power sources can include at least one of: a solar power source, or a wind power source In some implementations, the process 600 can also include determining, for each of the candidate configurations, a sensitivity of the performance of the Power-to-X plant according to the design options defined by that candidate configuration.

In some implementations, the process 600 can also include predicting the performance of the Power-to-X plant a plurality of times, where each prediction is performed based on a different respective set of assumptions regarding a price of power.

In some implementations, the process 600 can also include implementing and operating the Power-to-X plant based on the second data set.

In some implementations, generating the one or more second candidate configurations can include: determining, based on the predicted performance of each of the first candidate configurations, an estimate of an objective function, where the objective function represents a performance of the Power-to-X plant based on one or more input parameters; and generating the one more second candidate configurations based on the estimate of the objective function.

In some implementations, determining the one or more configurations can include predicting, based on the execution of the data processing application, the performance of the Power-to-X plant according to each of the one or more second candidate configurations.

In some implementations, determining the one or more configurations can include selecting the one or more configurations from among the first and second configurations based on the predicted performance.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 (e.g., the Power-to-X optimization engine, the computer system 102, the computer system 104*a*-104*n*, etc.) can be implemented using digital electronic circuitry, or in computer software, firmware, or hardware, or in combinations of one or more of them. In another example, the process 600 shown in FIG. 6 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparati, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 7:
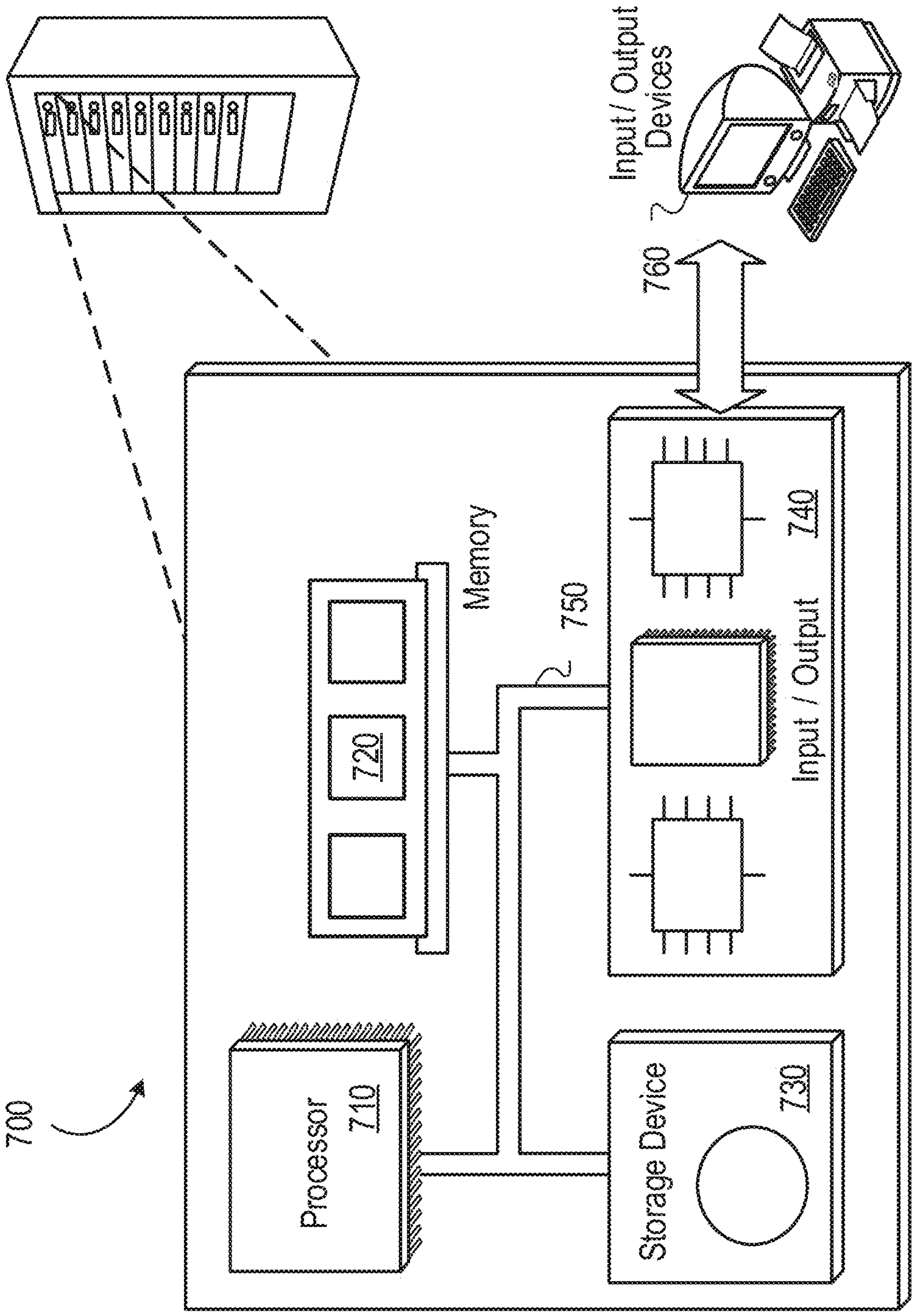
FIG. 7 is a schematic diagram of an example computer system.

FIG. 7 shows an example computer system 700 that includes a processor 710, a memory 720, a storage device 730 and an input/output device 740. Each of the components 710, 720, 730 and 740 can be interconnected, for example, by a system bus 750. The processor 710 is capable of processing instructions for execution within the system 700.

In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the system 700.

The input/output device 740 provides input/output operations for the system 700. In some implementations, the input/output device 740 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:

accessing, by one or more processors from one or more hardware data storage devices, a first data set representing one or more parameters for implementing and operating a Power-to-X plant;

determining, by the one or more processors, one or more configurations of the Power-to-X plant based on the first data set and a Bayesian optimization process, wherein determining the one or more configurations of the Power-to-X plant comprises:

parsing, by a parser module, the first data set to identify one or more fields in the first data set, wherein each of the one or more fields represents a respective parameter and specifies a value of that parameter;

generating a plurality of data vectors representing respective first candidate configurations of the Power-to-X plant, inputting the data vectors and the first data set into a data processing application for executing a computer model, wherein the computer model is configured to provide a digital representation of the Power-to-X plant, predicting, based on the execution of the data processing application, a performance of the Power-to-X plant according to each of the first candidate configurations, wherein predicting the performance of the Power-to-X plant comprises:

determining a first set of forecast data representing at least one of a forecasted future market condition or a forecasted future environmental condition during a first time interval, simulating, using the computer model, a first operation of the Power-to-X plant during the first time interval based on the first set of forecast data, and determining an output of the Power-to-X plant during the first time interval based on the simulated first operation, and generating, using the Bayesian optimization process, one or more second candidate configurations based on the predicted performance;

generating, by the one or more processors, a second data set representing the one or more optimized configurations of the Power-to-X plant;

storing, by the one or processors, the second data set representing the one or more optimized configurations using the one or more hardware data storage devices; and causing at least one of implementation or operation of the Power-to-X plant based on the second data set representing one or more optimized configurations, wherein causing the implementation or the operation of the Power-to-X plant comprises causing the Power-to-X plant to use electrical power to perform a second production process to produce one or more chemical products according to the one or more optimized configurations.

2. The method of claim 1, further comprising:

causing a graphical user interface to be presented to a user, and wherein the graphical user interface comprises one or more first user interface elements representing the one or more configurations of the Power-to-X plant.

3. The method of claim 2, wherein the graphical user interface comprises one or more second user interface elements representing an output of the computer model.

4. The method of claim 1, wherein the first set of forecast data represents at least one of:

a forecasted future solar activity during the first time interval, a forecasted future wind activity during the first time interval, or a forecasted future commodity price during the first time interval.

5. The method of claim 1, wherein predicting the performance of the Power-to-X further comprises:

determining a second set of forecast data representing at least one of a future forecasted market condition or a forecasted future environmental condition during a second time interval subsequent to the first time interval, simulating, during the computer model, a second operation of the Power-to-X plant during the second time interval based on the second set of forecast data, and determining an output of the Power-to-X plant during the second time interval based on the simulated second operation.

6. The method of claim 1, wherein predicting the performance of the Power-to-X plant comprises:

determining a plurality of consecutive time intervals, and for each of the time intervals:

determining a set of future forecast data representing at least one of a forecasted market condition or a forecasted environmental condition during that time interval, simulating, using the computer model, an operation of the Power-to-X plant during that time interval based on the set of forecast data, and determining an output of the Power-to-X plant during that time interval based on the simulated operation.

7. The method of claim 1, wherein determining the one or more configurations comprises:

determining one or more objective functions representing the performance of the Power-to-X plant, determining one or more selection criteria with respect to the one or more objective functions, and determining, using the Bayesian optimization process, one or more of the first and/or the second candidate configurations that satisfy the one or more selection criteria.

8. The method of claim 1, wherein the first data set represents one or more types of production processes of the Power-to-X plant.

9. The method of claim 8, wherein the one or more types of production processes comprise at least one of:

a water electrolysis process, a fuel production process, or an ammonia production process.

10. The method of claim 8, wherein the first data set represents, for each of the one or more types of production processes, at least one of:

a cost associated with implementing that type of production process at the Power-to-X plant, a time associated with implementing that type of production process at the Power-to-X plant, a demand for products produced by that type of production process at the Power-to-X plant, an efficiency of that type of production process at the Power-to-X plant, a degradation over time of that type of production process at the Power-to-X plant, or a geographical location of the Power-to-X plant.

11. The method of claim 1, wherein each of the first and the second candidate configurations of the Power-to-X plant represents at least one of:

an amount of power received by the Power-to-X plant from one or more power sources, an energy storage capacity of the Power-to-X plant, an amount of power input to one or more water electrolyzers of the Power-to-X plant, a hydrogen storage capacity of the Power-to-X plant, a fuel storage capacity of the Power-to-X plant, or an ammonia storage capacity of the Power-to-X plant.

12. The method of claim 11, wherein the one or more power sources comprise at least one of:

a solar power source, or a wind power source.

13. The method of claim 1, further comprising:

determining, for each of the first and second candidate configurations, a sensitivity of the performance of the Power-to-X plant according to design options defined by that candidate configuration.

14. The method of claim 1, further comprising:

predicting the performance of the Power-to-X plant a plurality of times, wherein each prediction is performed based on a different respective set of assumptions regarding a price of power.

15. The method of claim 1, further comprising:

implementing and operating the Power-to-X plant based on the second data set.

16. The method of claim 1, wherein generating the one or more second candidate configurations comprises:

determining, based on the predicted performance of each of the first candidate configurations, an estimate of an objective function, wherein the objective function represents a performance of the Power-to-X plant based on one or more input parameters; and generating the one more second candidate configurations based on the estimate of the objective function.

17. The method of claim 16, wherein determining the one or more configurations comprises:

predicting, based on the execution of the data processing application, the performance of the Power-to-X plant according to each of the one or more second candidate configurations.

18. The method of claim 17, wherein determining the one or more configurations comprises:

selecting the one or more configurations from among the first and second configurations based on the predicted performance.

19. A system, comprising:

at least one processor; and a memory communicatively coupled to the at least one processor, the memory storing instructions which, when executed by the at least one processor, cause the at least one processor to perform operations comprising:

accessing, from one or more hardware data storage devices, a first data set representing one or more parameters for implementing and operating a Power-to-X plant;

determining one or more configurations of the Power-to-X plant based on the first data set and a Bayesian optimization process, wherein determining the one or more configurations of the Power-to-X plant comprises:

parsing, by a parser module, the first data set to identify one or more fields in the first data set, wherein each of the one or more fields represents a respective parameter and specifies a value of that parameter:

generating a plurality of data vectors representing respective first candidate configurations of the Power-to-X plant, inputting the data vectors and the first data set into a data processing application for executing a computer model, wherein the computer model is configured to provide a digital representation of the Power-to-X plant, predicting, based on the execution of the data processing application, a performance of the Power-to-X plant according to each of the first candidate configurations, wherein predicting the performance of the Power-to-X plant comprises:

determining a first set of forecast data representing at least one of a forecasted future market condition or a forecasted future environmental condition during a first time interval, simulating, using the computer model, a first operation of the Power-to-X plant during the first time interval based on the first set of forecast data, and determining an output of the Power-to-X plant during the first time interval based on the simulated first operation, and generating, using the Bayesian optimization process, one or more second candidate configurations based on the predicted performance;

generating a second data set representing the one or more optimized configurations of the Power-to-X plant;

storing the second data set representing the one or more optimized configurations using the one or more hardware data storage devices; and causing at least one of implementation or operation of the Power-to-X plant based on the second data set representing one or more optimized configurations, wherein causing the implementation or the operation of the Power-to-X plant comprises causing the Power-to-X plant to use electrical power to perform a second production process to produce one or more chemical products according to the one or more optimized configurations.

20. One or more non-transitory computer-readable media storing instructions which, when executed by at least one processor, cause the at least one processor to perform operations comprising:

accessing, from one or more hardware data storage devices, a first data set representing one or more parameters for implementing and operating a Power-to-X plant;

determining one or more configurations of the Power-to-X plant based on the first data set and a Bayesian optimization process, wherein determining the one or more configurations of the Power-to-X plant comprises:

parsing, by a parser module, the first data set to identify one or more fields in the first data set, wherein each of the one or more fields represents a respective parameter and specifies a value of that parameter;

generating a plurality of data vectors representing respective first candidate configurations of the Power-to-X plant, inputting the data vectors and the first data set into a data processing application for executing a computer model, wherein the computer model is configured to provide a digital representation of the Power-to-X plant, predicting, based on the execution of the data processing application, a performance of the Power-to-X plant according to each of the first candidate configurations, wherein predicting the performance of the Power-to-X plant comprises:

determining a first set of forecast data representing at least one of a forecasted future market condition or a forecasted future environmental condition during a first time interval, simulating, using the computer model, a first operation of the Power-to-X plant during the first time interval based on the first set of forecast data, and determining an output of the Power-to-X plant during the first time interval based on the simulated first operation, and generating, using the Bayesian optimization process, one or more second candidate configurations based on the predicted performance;

generating a second data set representing the one or more optimized configurations of the Power-to-X plant;

storing the second data set representing the one or more optimized configurations using the one or more hardware data storage devices; and causing at least one of implementation or operation of the Power-to-X plant based on the second data set representing one or more optimized configurations, wherein causing the implementation or the operation of the Power-to-X plant comprises causing the Power-to-X plant to use electrical power to perform a second production process to produce one or more chemical products according to the one or more optimized configurations.

21. The method of claim 1, wherein causing the Power-to-X plant to use the electrical power to perform the second production process to produce one or more chemical products according to the one or more optimized configurations comprises: causing the Power-to-X plant to use electrical power and water to perform water electrolysis to produce hydrogen according to the one or more optimized configurations.

22. The method of claim 1, wherein causing the Power-to-X plant to use the electrical power to perform the second production process to produce one or more chemical products according to the one or more optimized configurations comprises:

causing the Power-to-X plant to use the electrical power, hydrogen, and nitrogen to perform a second production process to produce ammonia according to the one or more optimized configurations.

23. The method of claim 1, wherein causing the Power-to-X plant to use the electrical power to perform the second production process to produce one or more chemical products according to the one or more optimized configurations comprises:

causing the Power-to-X plant to use the electrical power and carbon dioxide to perform a second production process to produce methane according to the one or more optimized configurations.

24. The method of claim 1, wherein causing the Power-to-X plant to use the electrical power to perform the second production process to produce one or more chemical products according to the one or more optimized configurations comprises:

causing the Power-to-X plant to use the electrical power, hydrogen, and carbon monoxide to perform a second production process to produce methanol according to the one or more optimized configurations.

* * * * *